US012009781B2

(12) United States Patent
Clemente et al.

(10) Patent No.: US 12,009,781 B2
(45) Date of Patent: Jun. 11, 2024

(54) JUMPER MODULE FOR PHOTOVOLTAIC SYSTEMS

(71) Applicant: GAF Energy LLC, Parsippany, NJ (US)

(72) Inventors: Peter Clemente, San Rafael, CA (US); Lewis Abra, San Francisco, CA (US); Evan Wray, Cotati, CA (US); Michael Kuiper, Newark, CA (US); Alex Yang, San Francisco, CA (US)

(73) Assignee: GAF Energy LLC, Parsippany, NJ (US)

( * ) Notice: Subject to any disclaimer, the term of this patent is extended or adjusted under 35 U.S.C. 154(b) by 0 days.

(21) Appl. No.: 17/858,618

(22) Filed: Jul. 6, 2022

(65) Prior Publication Data
US 2023/0007941 A1 Jan. 12, 2023

Related U.S. Application Data

(60) Provisional application No. 63/218,641, filed on Jul. 6, 2021.

(51) Int. Cl.
*H02S 40/34* (2014.01)
*H02S 20/25* (2014.01)

(52) U.S. Cl.
CPC ............ *H02S 40/34* (2014.12); *H02S 20/25* (2014.12)

(58) Field of Classification Search
CPC .......... H02S 40/22; H02S 40/34; H02S 40/36; H02S 20/23–24
See application file for complete search history.

(56) References Cited

U.S. PATENT DOCUMENTS

| 1,981,467 | A | 11/1934 | Radtke |
| 3,156,491 | A | 11/1964 | Jackson et al. |
| 3,156,497 | A | 11/1964 | Lessard |
| 4,258,948 | A | 3/1981 | Hoffmann |
| 4,349,220 | A | 9/1982 | Carroll et al. |
| 4,499,702 | A | 2/1985 | Turner |

(Continued)

FOREIGN PATENT DOCUMENTS

| CA | 2829440 C | 5/2019 |
| CH | 700095 A2 | 6/2010 |

(Continued)

OTHER PUBLICATIONS

Sunflare, Procducts: "Sunflare Develops Prototype For New Residential Solar Shingles"; 2019 <<sunflaresolar.com/news/sunflare-develops-prototype-for-new-residential-solar-shingles>> retrieved Feb. 2, 2021.

(Continued)

*Primary Examiner* — Daniel P Malley, Jr.
(74) *Attorney, Agent, or Firm* — GREENBERG TRAURIG, LLP

(57) ABSTRACT

A system includes a plurality of photovoltaic modules installed on a roof deck in an array and at least one jumper module electrically connecting a first subarray to a second subarray of the array. The jumper module includes at least one electrical bussing and an encapsulant encapsulating the at least one electrical bussing. The jumper module includes a frontsheet juxtaposed with the encapsulant. The frontsheet includes a first layer and a polymer layer attached to the first layer.

20 Claims, 11 Drawing Sheets

(56) References Cited

U.S. PATENT DOCUMENTS

| | | |
|---|---|---|
| 4,636,577 A | 1/1987 | Peterpaul |
| 5,167,579 A | 12/1992 | Rotter |
| 5,437,735 A | 8/1995 | Younan et al. |
| 5,590,495 A | 1/1997 | Bressler et al. |
| 5,642,596 A | 7/1997 | Waddington |
| 6,008,450 A | 12/1999 | Ohtsuka et al. |
| 6,033,270 A | 3/2000 | Stuart |
| 6,046,399 A | 4/2000 | Kapner |
| 6,201,180 B1 | 3/2001 | Meyer et al. |
| 6,220,329 B1 | 4/2001 | King et al. |
| 6,320,114 B1 | 11/2001 | Kuechler |
| 6,320,115 B1 | 11/2001 | Kataoka et al. |
| 6,336,304 B1 | 1/2002 | Mimura et al. |
| 6,341,454 B1 | 1/2002 | Koleoglou |
| 6,407,329 B1 | 6/2002 | Iino et al. |
| 6,576,830 B2 | 6/2003 | Nagao et al. |
| 6,928,781 B2 | 8/2005 | Desbois et al. |
| 6,972,367 B2 | 12/2005 | Federspiel et al. |
| 7,138,578 B2 | 11/2006 | Komamine |
| 7,155,870 B2 | 1/2007 | Almy |
| 7,178,295 B2 | 2/2007 | Dinwoodie |
| 7,487,771 B1 | 2/2009 | Eiffert et al. |
| 7,587,864 B2 | 9/2009 | McCaskill et al. |
| 7,678,990 B2 | 3/2010 | McCaskill et al. |
| 7,678,991 B2 | 3/2010 | McCaskill et al. |
| 7,748,191 B2 | 7/2010 | Podirsky |
| 7,819,114 B2 | 10/2010 | Augenbraun et al. |
| 7,824,191 B1 | 11/2010 | Podirsky |
| 7,832,176 B2 | 11/2010 | McCaskill et al. |
| 8,118,109 B1 | 2/2012 | Hacker |
| 8,168,880 B2 | 5/2012 | Jacobs et al. |
| 8,173,889 B2 | 5/2012 | Kalkanoglu et al. |
| 8,210,570 B1 | 7/2012 | Railkar et al. |
| 8,276,329 B2 | 10/2012 | Lenox |
| 8,312,693 B2 | 11/2012 | Cappelli |
| 8,319,093 B2 | 11/2012 | Kalkanoglu et al. |
| 8,333,040 B2 | 12/2012 | Shiao et al. |
| 8,371,076 B2 | 2/2013 | Jones et al. |
| 8,375,653 B2 | 2/2013 | Shiao et al. |
| 8,404,967 B2 | 3/2013 | Kalkanoglu et al. |
| 8,410,349 B2 | 4/2013 | Kalkanoglu et al. |
| 8,418,415 B2 | 4/2013 | Shiao et al. |
| 8,438,796 B2 | 5/2013 | Shiao et al. |
| 8,468,754 B2 | 6/2013 | Railkar et al. |
| 8,468,757 B2 | 6/2013 | Krause et al. |
| 8,505,249 B2 | 8/2013 | Geary |
| 8,512,866 B2 | 8/2013 | Taylor |
| 8,513,517 B2 | 8/2013 | Kalkanoglu et al. |
| 8,586,856 B2 | 11/2013 | Kalkanoglu et al. |
| 8,601,754 B2 | 12/2013 | Jenkins et al. |
| 8,629,578 B2 | 1/2014 | Kurs et al. |
| 8,646,228 B2 | 2/2014 | Jenkins |
| 8,656,657 B2 | 2/2014 | Livsey et al. |
| 8,671,630 B2 | 3/2014 | Lena et al. |
| 8,677,702 B2 | 3/2014 | Jenkins |
| 8,695,289 B2 | 4/2014 | Koch et al. |
| 8,713,858 B1 | 5/2014 | Xie |
| 8,713,860 B2 | 5/2014 | Railkar et al. |
| 8,733,038 B2 | 5/2014 | Kalkanoglu et al. |
| 8,776,455 B2 | 7/2014 | Azoulay |
| 8,789,321 B2 | 7/2014 | Ishida |
| 8,793,940 B2 | 8/2014 | Kalkanoglu et al. |
| 8,793,941 B2 | 8/2014 | Bosler et al. |
| 8,826,607 B2 | 9/2014 | Shiao et al. |
| 8,835,751 B2 | 9/2014 | Kalkanoglu et al. |
| 8,863,451 B2 | 10/2014 | Jenkins et al. |
| 8,898,970 B2 | 12/2014 | Jenkins et al. |
| 8,925,262 B2 | 1/2015 | Railkar et al. |
| 8,943,766 B2 | 2/2015 | Gombarick et al. |
| 8,946,544 B2 | 2/2015 | Jabos et al. |
| 8,950,128 B2 | 2/2015 | Kalkanoglu et al. |
| 8,959,848 B2 | 2/2015 | Jenkins et al. |
| 8,966,838 B2 | 3/2015 | Jenkins |
| 8,966,850 B2 | 3/2015 | Jenkins et al. |
| 8,994,224 B2 | 3/2015 | Mehta et al. |
| 9,032,672 B2 | 5/2015 | Livsey et al. |
| 9,153,950 B2 | 10/2015 | Yamanaka et al. |
| 9,166,087 B2 | 10/2015 | Chihlas et al. |
| 9,169,646 B2 | 10/2015 | Rodrigues et al. |
| 9,170,034 B2 | 10/2015 | Bosler et al. |
| 9,178,465 B2 | 11/2015 | Shiao et al. |
| 9,202,955 B2 | 12/2015 | Livsey et al. |
| 9,212,832 B2 | 12/2015 | Jenkins |
| 9,217,584 B2 | 12/2015 | Kalkanoglu et al. |
| 9,270,221 B2 | 2/2016 | Zhao |
| 9,273,885 B2 | 3/2016 | Rordigues et al. |
| 9,276,141 B2 | 3/2016 | Kalkanoglu et al. |
| 9,331,224 B2 | 5/2016 | Koch et al. |
| 9,356,174 B2 | 5/2016 | Duarte et al. |
| 9,359,014 B1 | 6/2016 | Yang et al. |
| 9,412,890 B1 | 8/2016 | Meyers |
| 9,528,270 B2 | 12/2016 | Jenkins et al. |
| 9,605,432 B1 | 3/2017 | Robbins |
| 9,711,672 B2 | 7/2017 | Wang |
| 9,755,573 B2 | 9/2017 | Livsey et al. |
| 9,786,802 B2 | 10/2017 | Shiao et al. |
| 9,831,818 B2 | 11/2017 | West |
| 9,912,284 B2 | 3/2018 | Svec |
| 9,923,515 B2 | 3/2018 | Rodrigues et al. |
| 9,938,729 B2 | 4/2018 | Coon |
| 9,991,412 B2 | 6/2018 | Gonzalez et al. |
| 9,998,067 B2 | 6/2018 | Kalkanoglu et al. |
| 10,027,273 B2 | 7/2018 | West et al. |
| 10,115,850 B2 | 10/2018 | Rodrigues et al. |
| 10,128,660 B1 | 11/2018 | Apte et al. |
| 10,156,075 B1 | 12/2018 | McDonough |
| 10,187,005 B2 | 1/2019 | Rodrigues et al. |
| 10,256,765 B2 | 4/2019 | Rodrigues et al. |
| 10,284,136 B1 | 5/2019 | Mayfield et al. |
| 10,454,408 B2 | 10/2019 | Livsey et al. |
| 10,530,292 B1 | 1/2020 | Cropper et al. |
| 10,560,048 B2 | 2/2020 | Fisher et al. |
| 10,563,406 B2 | 2/2020 | Kalkanoglu et al. |
| D879,031 S | 3/2020 | Lance et al. |
| 10,784,813 B2 | 9/2020 | Kalkanoglu et al. |
| D904,289 S | 12/2020 | Lance et al. |
| 11,012,026 B2 | 5/2021 | Kalkanoglu et al. |
| 11,177,639 B1 | 11/2021 | Nguyen et al. |
| 11,217,715 B2 | 1/2022 | Sharenko |
| 11,251,744 B1 | 2/2022 | Bunea et al. |
| 11,258,399 B2 | 2/2022 | Kalkanoglu et al. |
| 11,283,394 B2 | 3/2022 | Perkins et al. |
| 11,309,828 B2 | 4/2022 | Sirski et al. |
| 11,394,344 B2 | 7/2022 | Perkins et al. |
| 11,424,379 B2 | 8/2022 | Sharenko et al. |
| 11,431,280 B2 | 8/2022 | Liu et al. |
| 11,431,281 B2 | 8/2022 | Perkins et al. |
| 11,444,569 B2 | 9/2022 | Clemente et al. |
| 11,454,027 B2 | 9/2022 | Kuiper et al. |
| 11,459,757 B2 | 10/2022 | Nguyen et al. |
| 11,486,144 B2 | 11/2022 | Bunea et al. |
| 11,489,482 B2 | 11/2022 | Peterson et al. |
| 11,496,088 B2 | 11/2022 | Sirski et al. |
| 11,508,861 B1 | 11/2022 | Perkins et al. |
| 11,512,480 B1 | 11/2022 | Achor et al. |
| 11,527,665 B2 | 12/2022 | Boitnott |
| 11,545,927 B2 | 1/2023 | Abra et al. |
| 11,545,928 B2 | 1/2023 | Perkins et al. |
| 11,658,470 B2 | 5/2023 | Nguyen et al. |
| 11,661,745 B2 | 5/2023 | Bunea et al. |
| 11,689,149 B2 | 6/2023 | Clemente et al. |
| 11,705,531 B2 | 7/2023 | Sharenko et al. |
| 11,728,759 B2 | 8/2023 | Nguyen et al. |
| 11,732,490 B2 | 8/2023 | Achor et al. |
| 11,811,361 B1 | 11/2023 | Farhangi et al. |
| 11,824,486 B2 | 11/2023 | Nguyen et al. |
| 11,824,487 B2 | 11/2023 | Nguyen et al. |
| 11,843,067 B2 | 12/2023 | Nguyen et al. |
| 2002/0053360 A1 | 5/2002 | Kinoshita et al. |
| 2002/0129849 A1 | 9/2002 | Heckeroth |
| 2003/0101662 A1 | 6/2003 | Ullman |
| 2003/0132265 A1 | 7/2003 | Villela et al. |
| 2003/0217768 A1 | 11/2003 | Guha |
| 2004/0000334 A1 | 1/2004 | Ressler |

(56) References Cited

U.S. PATENT DOCUMENTS

| | | |
|---|---|---|
| 2005/0030187 A1 | 2/2005 | Peress et al. |
| 2005/0115603 A1 | 6/2005 | Yoshida et al. |
| 2005/0144870 A1 | 7/2005 | Dinwoodie |
| 2005/0178428 A1 | 8/2005 | Laaly et al. |
| 2006/0042683 A1 | 3/2006 | Gangemi |
| 2006/0046084 A1 | 3/2006 | Yang et al. |
| 2007/0074757 A1 | 4/2007 | Mellott et al. |
| 2007/0181174 A1 | 8/2007 | Ressler |
| 2007/0193618 A1 | 8/2007 | Bressler et al. |
| 2007/0249194 A1 | 10/2007 | Liao |
| 2007/0295385 A1 | 12/2007 | Sheats et al. |
| 2008/0006323 A1 | 1/2008 | Kalkanoglu et al. |
| 2008/0035140 A1 | 2/2008 | Placer et al. |
| 2008/0315061 A1 | 2/2008 | Placerl. et al. |
| 2008/0078440 A1 | 4/2008 | Lim et al. |
| 2008/0185748 A1 | 8/2008 | Kalkanoglu |
| 2008/0271774 A1 | 11/2008 | Kalkanoglu et al. |
| 2008/0302030 A1 | 12/2008 | Stancel et al. |
| 2009/0000222 A1 | 1/2009 | Kalkanoglu et al. |
| 2009/0014058 A1 | 1/2009 | Croft et al. |
| 2009/0019795 A1 | 1/2009 | Szacsvay et al. |
| 2009/0044850 A1 | 2/2009 | Kimberley |
| 2009/0114261 A1 | 5/2009 | Stancel et al. |
| 2009/0133340 A1 | 5/2009 | Shiao et al. |
| 2009/0159118 A1 | 6/2009 | Kalkanoglu et al. |
| 2009/0178350 A1 | 7/2009 | Kalkanoglu et al. |
| 2009/0229652 A1 | 9/2009 | Mapel et al. |
| 2009/0275247 A1 | 11/2009 | Richter et al. |
| 2010/0019580 A1 | 1/2010 | Croft et al. |
| 2010/0095618 A1 | 4/2010 | Edison et al. |
| 2010/0101634 A1 | 4/2010 | Frank et al. |
| 2010/0116325 A1 | 5/2010 | Nikoonahad |
| 2010/0131108 A1 | 5/2010 | Meyer |
| 2010/0139184 A1 | 6/2010 | Williams et al. |
| 2010/0146878 A1 | 6/2010 | Koch et al. |
| 2010/0159221 A1 | 6/2010 | Kourtakis et al. |
| 2010/0170169 A1 | 7/2010 | Railkar et al. |
| 2010/0186798 A1 | 7/2010 | Tormen et al. |
| 2010/0242381 A1 | 9/2010 | Jenkins |
| 2010/0313499 A1 | 12/2010 | Gangemi |
| 2010/0326488 A1 | 12/2010 | Aue et al. |
| 2010/0326501 A1 | 12/2010 | Zhao et al. |
| 2011/0030761 A1 | 2/2011 | Kalkanoglu et al. |
| 2011/0036386 A1 | 2/2011 | Browder |
| 2011/0036389 A1 | 2/2011 | Hardikar et al. |
| 2011/0048507 A1* | 3/2011 | Livsey ............... F24S 25/61 52/173.3 |
| 2011/0058337 A1 | 3/2011 | Han et al. |
| 2011/0061326 A1 | 3/2011 | Jenkins |
| 2011/0100436 A1 | 5/2011 | Cleereman et al. |
| 2011/0104488 A1 | 5/2011 | Muessig et al. |
| 2011/0132427 A1 | 6/2011 | Kalkanoglu et al. |
| 2011/0168238 A1 | 7/2011 | Metin et al. |
| 2011/0239555 A1 | 10/2011 | Cook et al. |
| 2011/0302859 A1 | 12/2011 | Crasnianski |
| 2012/0034799 A1 | 2/2012 | Hunt |
| 2012/0060902 A1 | 3/2012 | Drake |
| 2012/0085392 A1 | 4/2012 | Albert et al. |
| 2012/0137600 A1 | 6/2012 | Jenkins |
| 2012/0176077 A1 | 7/2012 | Oh et al. |
| 2012/0212065 A1 | 8/2012 | Cheng et al. |
| 2012/0233940 A1 | 9/2012 | Perkins et al. |
| 2012/0240490 A1 | 9/2012 | Gangemi |
| 2012/0260977 A1 | 10/2012 | Stancel |
| 2012/0266942 A1 | 10/2012 | Komatsu et al. |
| 2012/0279150 A1 | 11/2012 | Pislkak et al. |
| 2012/0282437 A1 | 11/2012 | Clark et al. |
| 2012/0291848 A1 | 11/2012 | Sherman et al. |
| 2013/0008499 A1 | 1/2013 | Verger et al. |
| 2013/0014455 A1 | 1/2013 | Grieco |
| 2013/0118558 A1 | 5/2013 | Sherman |
| 2013/0193769 A1 | 8/2013 | Mehta et al. |
| 2013/0247988 A1* | 9/2013 | Reese ............... H02S 40/34 136/259 |
| 2013/0284267 A1 | 10/2013 | Plug et al. |
| 2013/0306137 A1 | 11/2013 | Ko |
| 2014/0090697 A1 | 4/2014 | Rodrigues et al. |
| 2014/0150843 A1 | 6/2014 | Pearce et al. |
| 2014/0173997 A1 | 6/2014 | Jenkins |
| 2014/0179220 A1 | 6/2014 | Railkar et al. |
| 2014/0182222 A1 | 7/2014 | Kalkanoglu et al. |
| 2014/0254776 A1 | 9/2014 | O'Connor et al. |
| 2014/0266289 A1 | 9/2014 | Della Sera et al. |
| 2014/0311556 A1 | 10/2014 | Feng et al. |
| 2014/0352760 A1 | 12/2014 | Haynes et al. |
| 2014/0366464 A1 | 12/2014 | Rodrigues et al. |
| 2015/0089895 A1 | 4/2015 | Leitch |
| 2015/0162459 A1 | 6/2015 | Lu et al. |
| 2015/0340516 A1 | 11/2015 | Kim et al. |
| 2015/0349173 A1 | 12/2015 | Morad et al. |
| 2016/0105144 A1 | 4/2016 | Haynes et al. |
| 2016/0118932 A1* | 4/2016 | Keenihan ............... H02S 20/25 136/251 |
| 2016/0142008 A1* | 5/2016 | Lopez ............... H02S 40/36 136/251 |
| 2016/0254776 A1 | 9/2016 | Rodrigues et al. |
| 2016/0276508 A1 | 9/2016 | Huang et al. |
| 2016/0359451 A1 | 12/2016 | Mao et al. |
| 2017/0159292 A1 | 6/2017 | Chihlas et al. |
| 2017/0179319 A1 | 6/2017 | Yamashita et al. |
| 2017/0179726 A1 | 6/2017 | Garrity et al. |
| 2017/0237390 A1 | 8/2017 | Hudson et al. |
| 2017/0331415 A1 | 11/2017 | Koppi et al. |
| 2018/0094438 A1 | 4/2018 | Wu et al. |
| 2018/0097472 A1 | 4/2018 | Anderson et al. |
| 2018/0115275 A1 | 4/2018 | Flanigan et al. |
| 2018/0254738 A1 | 9/2018 | Yang et al. |
| 2018/0351502 A1 | 12/2018 | Almy et al. |
| 2018/0367089 A1 | 12/2018 | Stutterheim et al. |
| 2019/0030867 A1 | 1/2019 | Sun et al. |
| 2019/0081436 A1 | 3/2019 | Onodi et al. |
| 2019/0115743 A1 | 4/2019 | Portillo |
| 2019/0123679 A1 | 4/2019 | Rodrigues et al. |
| 2019/0253022 A1 | 8/2019 | Hardar et al. |
| 2019/0305717 A1 | 10/2019 | Allen et al. |
| 2020/0109320 A1 | 4/2020 | Jiang |
| 2020/0144958 A1 | 5/2020 | Rodrigues et al. |
| 2020/0220819 A1 | 7/2020 | Vu et al. |
| 2020/0224419 A1 | 7/2020 | Boss et al. |
| 2020/0343397 A1* | 10/2020 | Hem-Jensen ............ F21S 8/086 |
| 2021/0115223 A1 | 4/2021 | Bonekamp et al. |
| 2021/0159353 A1 | 5/2021 | Li et al. |
| 2021/0343886 A1 | 11/2021 | Sharenko et al. |
| 2022/0149213 A1 | 5/2022 | Mensink et al. |

FOREIGN PATENT DOCUMENTS

| | | |
|---|---|---|
| CN | 202797032 U | 3/2013 |
| DE | 1958248 A1 | 11/1971 |
| EP | 1039361 B1 | 3/2004 |
| EP | 1837162 A1 | 9/2007 |
| EP | 1774372 A1 | 7/2011 |
| EP | 2446481 A2 | 5/2012 |
| EP | 2784241 A1 | 10/2014 |
| JP | 10046767 A | 2/1998 |
| JP | 2002-106151 A | 4/2002 |
| JP | 2001-098703 A | 10/2002 |
| JP | 2017-027735 A | 2/2017 |
| JP | 2018053707 A | 4/2018 |
| KR | 20090084060 A | 8/2009 |
| KR | 10-2019-0000367 A | 1/2019 |
| KR | 10-2253483 B1 | 5/2021 |
| NL | 2026856 B1 | 6/2022 |
| WO | 2011/049944 A1 | 4/2011 |
| WO | 2015/133632 A1 | 9/2015 |
| WO | 2018/000589 A1 | 1/2018 |
| WO | 2019/201416 A1 | 10/2019 |

(56) References Cited

FOREIGN PATENT DOCUMENTS

WO   2020-159358 A1   8/2020
WO   2021-247098 A1   12/2021

OTHER PUBLICATIONS

RGS Energy, 3.5kW Powerhouse 3.0 system installed in an afternoon; Jun. 7, 2019 <<facebook.com/RGSEnergy/>> retrieved Feb. 2, 2021.
Tesla, Solar Roof <<tesla.com/solarroof>> retrieved Feb. 2, 2021.
"Types of Roofing Underlayment", Owens Corning Roofing; <<https://www.owenscorning.com/en-US/roofing/tools/how-roofing-underlayment-helps-protect-your-home>> retrieved Nov. 1, 2021.

* cited by examiner

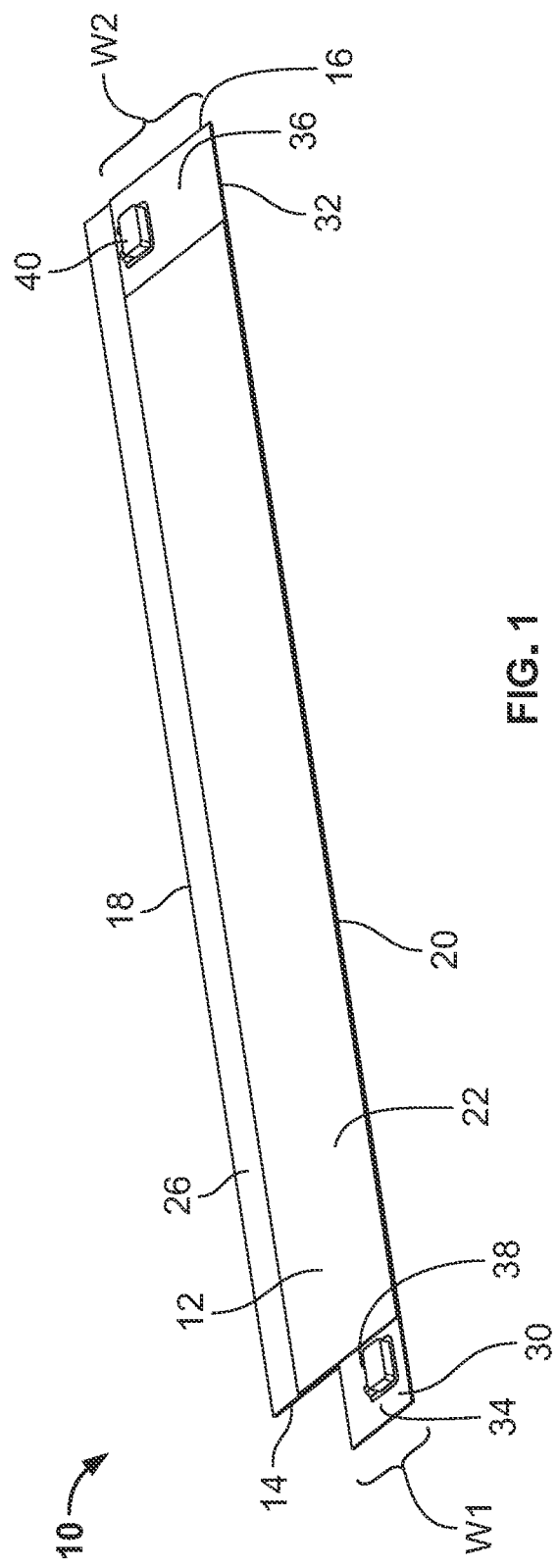
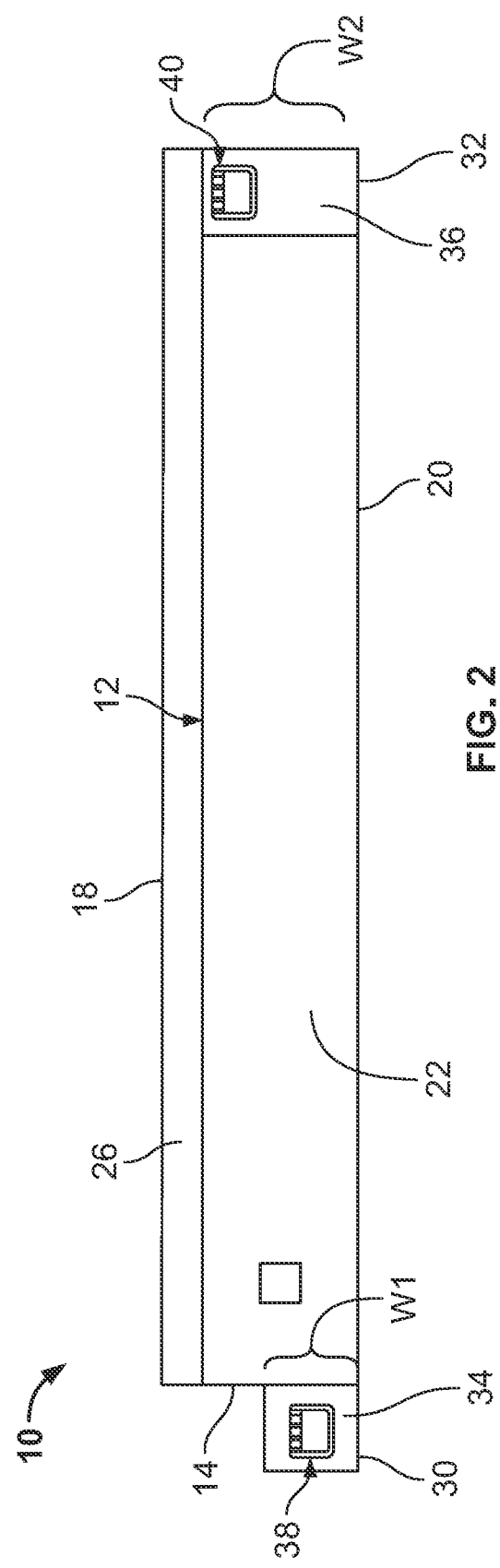

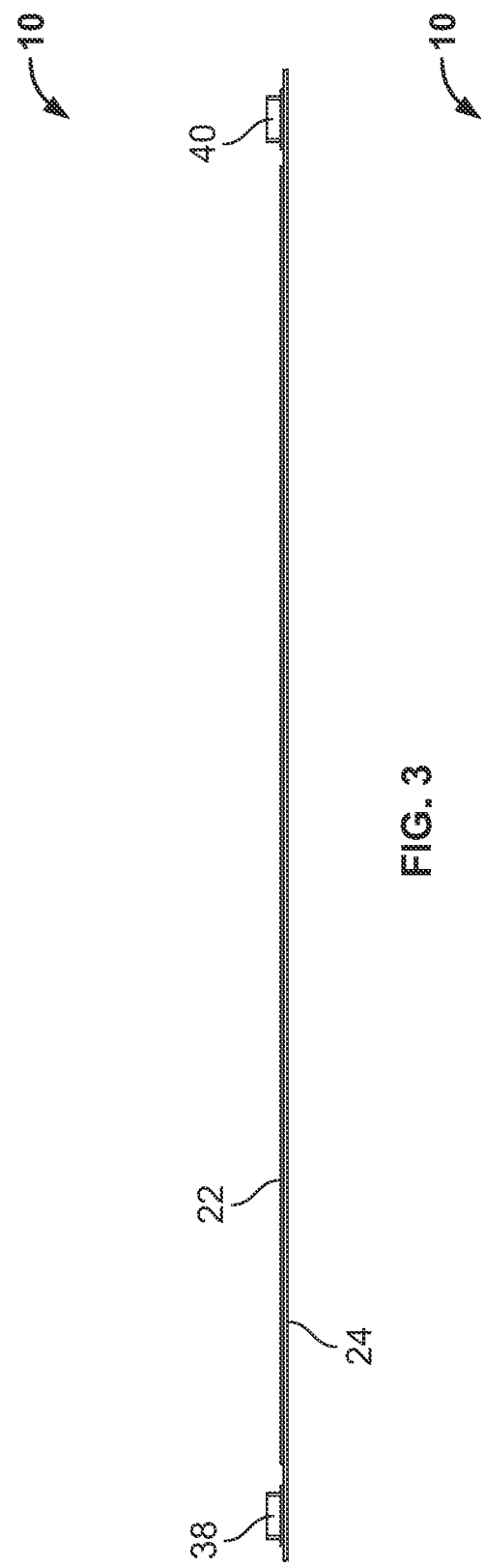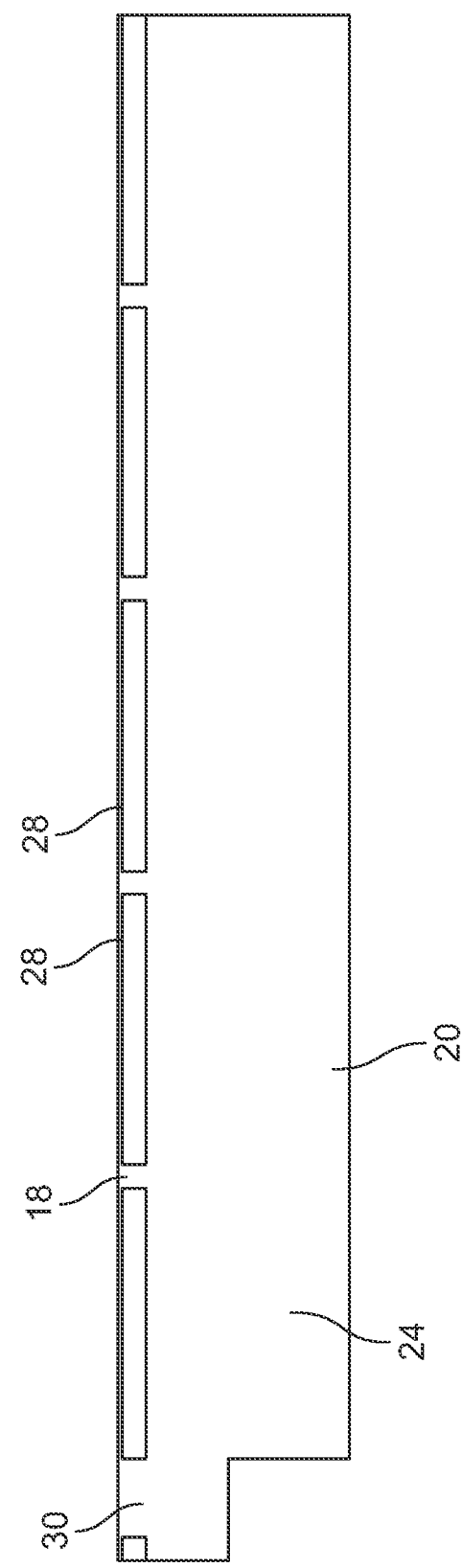

JUMPER MODULE FOR PHOTOVOLTAIC SYSTEMS

CROSS-REFERENCE TO RELATED APPLICATIONS

This application is a Section 111(a) application relating to and claiming the benefit of commonly-owned, U.S. Provisional Patent Application Ser. No. 63/218,641, filed Jul. 6, 2021, entitled "JUMPER MODULE FOR PHOTOVOLTAIC SYSTEMS," the contents of which are incorporated herein by reference in its entirety.

FIELD OF THE INVENTION

The present invention relates to jumper modules for photovoltaic systems and, more particularly, jumper modules for electrically connecting subarrays of photovoltaic modules.

BACKGROUND

Photovoltaic modules can be placed on building roofs (e.g., residential roofs) to generate electricity. What is needed is a jumper module for electrically connecting subarrays of photovoltaic modules installed on a roof deck.

SUMMARY

In some embodiments, a system includes a plurality of photovoltaic modules installed on a roof deck, wherein the photovoltaic modules are arranged in an array on the roof deck; and at least one jumper module electrically connecting a first subarray of the array and a second subarray of the array, wherein the at least one jumper module includes, at least one electrical bussing, an encapsulant encapsulating the at least one electrical bussing, wherein the encapsulant includes a first surface and a second surface opposite the first surface, wherein the at least one electrical bussing electrically connects the first subarray to the second subarray, a frontsheet juxtaposed with the first surface of the encapsulant, wherein the frontsheet includes a first layer, and a polymer layer attached to the first layer, and wherein the first layer forms an upper surface of the jumper module.

In some embodiments, the at least one jumper module includes a backsheet juxtaposed with the second surface of the encapsulant, wherein the backsheet includes a second layer, and a polymer layer attached to the second layer, wherein the second layer forms a lower surface of the at least one jumper module. In some embodiments, the at least one jumper module includes a first side lap located at a first end thereof and a second side lap located at a second end thereof opposite the first end. In some embodiments, the at least one electrical bussing extends from a location proximate to the first end to a location proximate to the second end. In some embodiments, the at least one jumper module includes a first junction box located on the first side lap, wherein the first junction box is electrically connected to the at least one electrical bussing. In some embodiments, the at least one jumper module includes a second junction box located on the second side lap, wherein the second junction box is electrically connected to the at least one electrical bussing.

In some embodiments, at least one of the plurality of photovoltaic modules of the first subarray includes a third junction box, wherein the third junction box is electrically connected to the first junction box. In some embodiments, at least one of the plurality of photovoltaic modules of the second subarray includes a fourth junction box, wherein the fourth junction box is electrically connected to the second junction box. In some embodiments, the at least one of the plurality of photovoltaic modules of the first subarray includes a head lap portion, and wherein one of the at least one jumper module overlays the head lap portion. In some embodiments, the at least one of the plurality of photovoltaic modules of the first subarray includes a first side lap, and wherein the first side lap of the one of the at least one jumper module is proximate to the first side lap of the at least one of the plurality of photovoltaic modules of the first subarray. In some embodiments, the at least one of the plurality of photovoltaic modules of the first subarray includes a second side lap, and wherein the second side lap of the one of the at least one jumper module is proximate to the second side lap of the at least one of the plurality of photovoltaic modules of the first subarray. In some embodiments, the at least one jumper module includes a plurality of jumper modules, and wherein the first side lap of another one of the plurality of jumper modules overlaps the second side lap of the one of the plurality of jumper modules.

In some embodiments, the first junction box of the another one of the plurality of jumper modules is proximate to and electrically connected to the second junction box of the one of the plurality of jumper modules. In some embodiments, at least one of the plurality of photovoltaic modules of the second subarray includes a head lap portion, and wherein the another one of the plurality of jumper modules overlaps the head lap portion of the at least one of the plurality of photovoltaic modules of the second subarray. In some embodiments, the first side lap does not include the first layer. In some embodiments, the polymer layer of the backsheet is composed of thermoplastic polyolefin (TPO). In some embodiments, the second layer is composed of thermoplastic polyolefin (TPO).

In some embodiments, a system, comprises a plurality of photovoltaic modules installed on a roof deck, wherein the photovoltaic modules are arranged in an array on the roof deck; and at least one jumper module electrically connecting a first subarray of the array and a second subarray of the array, wherein the at least one jumper module includes, a plurality of electrical wires, wherein each of the electrical wires includes a first end, and a second end opposite the first end, an encapsulant encapsulating at least a portion of the at least one electrical wire, wherein the encapsulant includes a first surface and a second surface opposite the first surface, wherein the at least one electrical wire electrically connects the first subarray to the second subarray, a frontsheet juxtaposed with the first surface of the encapsulant, wherein the frontsheet includes a first layer, and a polymer layer attached to the first layer, and wherein the first layer forms an upper surface of the jumper module, and a backsheet juxtaposed with the second surface of the encapsulant, wherein the backsheet includes a second layer, and a polymer layer attached to the second layer, wherein the second layer forms a lower surface of the at least one jumper module, wherein the second end of each of the electrical wires extends outwardly from the lower surface of the at least one jumper module, and wherein the second end of each of the electrical wires is configured to be installed within an aperture of the roof deck.

In some embodiments, the at least one jumper module includes a first side lap located at a first end thereof, a second side lap located at a second end thereof opposite the first end of the at least one jumper module, a first junction box located on the first side lap, wherein the first junction box is electrically connected to the first end of a first one of the plurality of electrical wires, and a second junction box located on the second side lap, wherein the second junction box is electrically connected to the first end of a second one of the plurality of electrical wires. In some embodiments, the at least one jumper module includes a conduit having a first end and a second end opposite the first end of the conduit, wherein the first end of the conduit is attached to the lower surface of the at least one jumper module, and wherein the second end of the first one of the plurality of electrical wires and the second end of the second one of the plurality of electrical wires is configured to extend from the second end of the conduit.

BRIEF DESCRIPTION OF DRAWINGS

FIG. 1 is a top perspective view of some embodiments of a jumper module for a photovoltaic system;

FIG. 2 is a top plan view of the jumper module shown in FIG. 1;

FIG. 3 is a side elevational view of the jumper module shown in FIG. 1;

FIG. 4 is a bottom plan view of the jumper module shown in FIG. 1;

DETAILED DESCRIPTION

Figure 5:
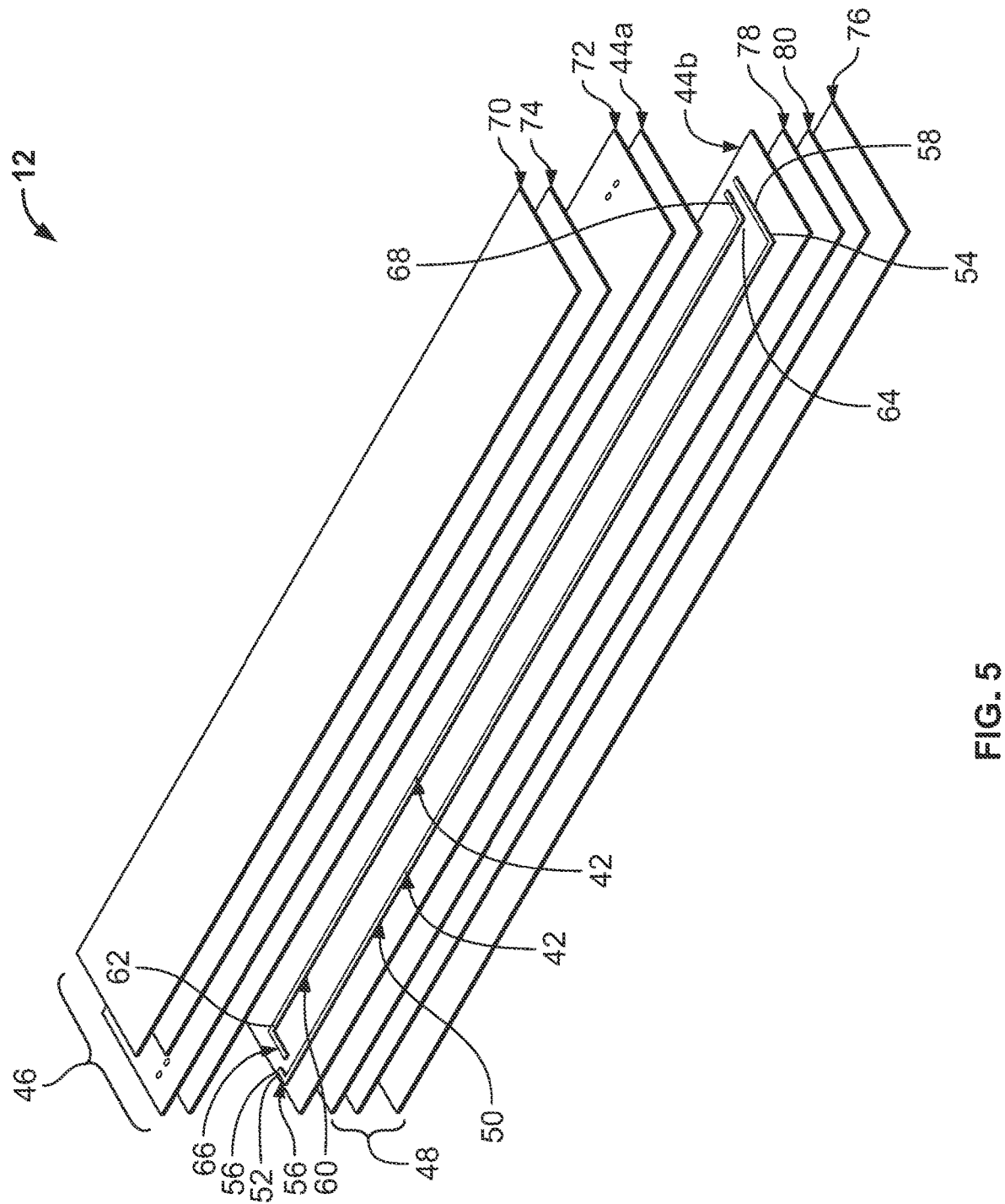
FIG. 5 is an exploded, top perspective view of an active portion of the jumper module shown in FIG. 1.

Referring to FIGS. 1 through 4, in some embodiments, a jumper module 10 includes an active portion 12 having a first end 14, a second end 16 opposite the first end 14, a first edge 18 extending from the first end 14 to the second end 16, and a second edge 20 opposite the first edge 18 and extending from the first end 14 to the second end 16. In some embodiments, the active portion 12 includes a first surface 22 and a second surface 24 opposite the first surface 22. In some embodiments, the jumper module 10 is configured to be installed on a roof deck. In some embodiments, the jumper module 10 is installed on the roof deck by a plurality of fasteners. In some embodiments, the active portion 12 includes a first zone 26 (nail zone) that extends from the first end 14 to the second end 16 and from the first edge 18 to a location intermediate the first edge 18 and the second edge 20. In some embodiments, the first zone 26 is configured to receive the plurality of fasteners. In some embodiments, the plurality of fasteners is installed through the first zone 26. In some embodiments, the plurality of fasteners includes a plurality of nails. In some embodiments, the plurality of fasteners includes a plurality of rivets. In some embodiments, the plurality of fasteners includes a plurality of staples. In some embodiments, the plurality of fasteners includes a plurality of screws.

In some embodiments, the jumper module 10 is installed on the roof deck by an adhesive 28. In some embodiments, the adhesive 28 includes at least one adhesive strip. In some embodiments, the adhesive 28 includes a plurality of adhesive strips. In some embodiments, the adhesive 28 is located on the second surface 24. In some embodiments, the adhesive 28 is located proximate to the first edge 18. In other embodiments, the adhesive 28 is located intermediate the first edge 18 and the second edge 20. In some embodiments, the adhesive 28 is located proximate to the second edge 20.

Still referring to FIGS. 1 through 4, in some embodiments, the jumper module 10 includes a first side lap 30 located the first end 14. In some embodiments, the jumper module 10 includes a second side lap 32 located at the second end 16. In some embodiments, the first side lap 30 includes a surface 34. In some embodiments, the second side lap 32 includes a surface 36. In some embodiments, the first side lap 30 is square in shape. In other embodiments, the first side lap 30 is rectangular in shape. In other embodiments, the first side lap 30 includes other suitable shapes and sizes. In some embodiments, the second side lap 32 is square in shape. In other embodiments, the second side lap 32 is rectangular in shape. In other embodiments, the second side lap 32 includes other suitable shapes and sizes. In some embodiments, the first side lap 30 is integral with the active portion 12. In some embodiments, the first side lap 30 is a separate component from the active portion 12. In some embodiments, the first side lap 30 is attached to the active portion 12. In some embodiments, the second side lap 32 is integral with the active portion 12. In some embodiments, the second side lap 32 is a separate component from the active portion 12. In some embodiments, the second side lap 32 is attached to the active portion 12.

In some embodiments, the first side lap 30 includes a first width W1. In some embodiments, the first width W1 extends from the second edge 20 to a location intermediate the first edge 18 and the second edge 20. In some embodiments, the second side lap 32 includes a second width W2. In some embodiments, the second width W2 extends from the first edge 18 to the second edge 20. In some embodiments, the width W1 of the first side lap 30 is approximately half the width W2 of the second side lap 32.

In some embodiments, the width W1 of the first side lap 30 is 70 mm to 120 mm. In some embodiments, the width W1 of the first side lap 30 is 70 mm to 110 mm. In some embodiments, the width W1 of the first side lap 30 is 70 mm to 100 mm. In some embodiments, the width W1 of the first side lap 30 is 70 mm to 90 mm. In some embodiments, the width W1 of the first side lap 30 is 70 mm to 80 mm. In some embodiments, the width W1 of the first side lap 30 is 80 mm to 120 mm. In some embodiments, the width W1 of the first side lap 30 is 80 mm to 110 mm. In some embodiments, the width W1 of the first side lap 30 is 80 mm to 100 mm. In some embodiments, the width W1 of the first side lap 30 is 80 mm to 90 mm. In some embodiments, the width W1 of the first side lap 30 is 90 mm to 120 mm. In some embodiments, the width W1 of the first side lap 30 is 90 mm to 110 mm. In some embodiments, the width W1 of the first side lap 30 is 90 mm to 100 mm. In some embodiments, the width W1 of the first side lap 30 is 100 mm to 120 mm. In some embodiments, the width W1 of the first side lap 30 is 100 mm to 110 mm. In some embodiments, the width W1 of the first side lap 30 is 110 mm to 120 mm.

In some embodiments, the width W2 of the second side lap 32 is 70 mm to 200 mm. In some embodiments, the width W2 of the second side lap 32 is 70 mm to 190 mm. In some embodiments, the width W2 of the second side lap 32 is 70 mm to 180 mm. In some embodiments, the width W2 of the second side lap 32 is 70 mm to 170 mm. In some embodiments, the width W2 of the second side lap 32 is 70 mm to 160 mm. In some embodiments, the width W2 of the second side lap 32 is 70 mm to 150 mm. In some embodiments, the width W2 of the second side lap 32 is 70 mm to 140 mm. In some embodiments, the width W2 of the second side lap 32 is 70 mm to 130 mm. In some embodiments, the width W2 of the second side lap 32 is 70 mm to 120 mm. In some embodiments, the width W2 of the second side lap 32 is 70 mm to 110 mm. In some embodiments, the width W2 of the second side lap 32 is 70 mm to 100 mm. In some embodiments, the width W2 of the second side lap 32 is 70 mm to 90 mm. In some embodiments, the width W2 of the second side lap 32 is 70 mm to 80 mm.

In some embodiments, the width W2 of the second side lap 32 is 80 mm to 200 mm. In some embodiments, the width W2 of the second side lap 32 is 80 mm to 190 mm. In some embodiments, the width W2 of the second side lap 32 is 80 mm to 180 mm. In some embodiments, the width W2 of the second side lap 32 is 80 mm to 170 mm. In some embodiments, the width W2 of the second side lap 32 is 80 mm to 160 mm. In some embodiments, the width W2 of the second side lap 32 is 80 mm to 150 mm. In some embodiments, the width W2 of the second side lap 32 is 80 mm to 140 mm. In some embodiments, the width W2 of the second side lap 32 is 80 mm to 130 mm. In some embodiments, the width W2 of the second side lap 32 is 80 mm to 120 mm. In some embodiments, the width W2 of the second side lap 32 is 80 mm to 110 mm. In some embodiments, the width W2 of the second side lap 32 is 80 mm to 100 mm. In some embodiments, the width W2 of the second side lap 32 is 80 mm to 90 mm.

In some embodiments, the width W2 of the second side lap 32 is 90 mm to 200 mm. In some embodiments, the width W2 of the second side lap 32 is 90 mm to 190 mm. In some embodiments, the width W2 of the second side lap 32 is 90 mm to 180 mm. In some embodiments, the width W2 of the second side lap 32 is 90 mm to 170 mm. In some embodiments, the width W2 of the second side lap 32 is 90 mm to 160 mm. In some embodiments, the width W2 of the second side lap 32 is 90 mm to 150 mm. In some embodiments, the width W2 of the second side lap 32 is 90 mm to 140 mm. In some embodiments, the width W2 of the second side lap 32 is 90 mm to 130 mm. In some embodiments, the width W2 of the second side lap 32 is 90 mm to 120 mm. In some embodiments, the width W2 of the second side lap 32 is 90 mm to 110 mm. In some embodiments, the width W2 of the second side lap 32 is 90 mm to 100 mm.

In some embodiments, the width W2 of the second side lap 32 is 100 mm to 200 mm. In some embodiments, the width W2 of the second side lap 32 is 100 mm to 190 mm. In some embodiments, the width W2 of the second side lap 32 is 100 mm to 180 mm. In some embodiments, the width W2 of the second side lap 32 is 100 mm to 170 mm. In some embodiments, the width W2 of the second side lap 32 is 100 mm to 160 mm. In some embodiments, the width W2 of the second side lap 32 is 100 mm to 150 mm. In some embodiments, the width W2 of the second side lap 32 is 100 mm to 140 mm. In some embodiments, the width W2 of the second side lap 32 is 100 mm to 130 mm. In some embodiments, the width W2 of the second side lap 32 is 100 mm to 120 mm. In some embodiments, the width W2 of the second side lap 32 is 100 mm to 110 mm.

In some embodiments, the width W2 of the second side lap 32 is 110 mm to 200 mm. In some embodiments, the width W2 of the second side lap 32 is 110 mm to 190 mm. In some embodiments, the width W2 of the second side lap 32 is 110 mm to 180 mm. In some embodiments, the width W2 of the second side lap 32 is 110 mm to 170 mm. In some embodiments, the width W2 of the second side lap 32 is 110 mm to 160 mm. In some embodiments, the width W2 of the second side lap 32 is 110 mm to 150 mm. In some embodiments, the width W2 of the second side lap 32 is 110 mm to 140 mm. In some embodiments, the width W2 of the second side lap 32 is 110 mm to 130 mm. In some embodiments, the width W2 of the second side lap 32 is 110 mm to 120 mm.

In some embodiments, the width W2 of the second side lap 32 is 120 mm to 200 mm. In some embodiments, the width W2 of the second side lap 32 is 120 mm to 190 mm. In some embodiments, the width W2 of the second side lap 32 is 120 mm to 180 mm. In some embodiments, the width W2 of the second side lap 32 is 120 mm to 170 mm. In some embodiments, the width W2 of the second side lap 32 is 120 mm to 160 mm. In some embodiments, the width W2 of the second side lap 32 is 120 mm to 150 mm. In some embodiments, the width W2 of the second side lap 32 is 120 mm to 140 mm. In some embodiments, the width W2 of the second side lap 32 is 120 mm to 130 mm.

In some embodiments, the width W2 of the second side lap 32 is 130 mm to 200 mm. In some embodiments, the width W2 of the second side lap 32 is 130 mm to 190 mm. In some embodiments, the width W2 of the second side lap 32 is 130 mm to 180 mm. In some embodiments, the width W2 of the second side lap 32 is 130 mm to 170 mm. In some embodiments, the width W2 of the second side lap 32 is 130 mm to 160 mm. In some embodiments, the width W2 of the second side lap 32 is 130 mm to 150 mm. In some embodiments, the width W2 of the second side lap 32 is 130 mm to 140 mm.

In some embodiments, the width W2 of the second side lap 32 is 140 mm to 200 mm. In some embodiments, the width W2 of the second side lap 32 is 140 mm to 190 mm. In some embodiments, the width W2 of the second side lap 32 is 140 mm to 180 mm. In some embodiments, the width W2 of the second side lap 32 is 140 mm to 170 mm. In some embodiments, the width W2 of the second side lap 32 is 140 mm to 160 mm. In some embodiments, the width W2 of the second side lap 32 is 140 mm to 150 mm. In some embodiments, the width W2 of the second side lap 32 is 150 mm to 200 mm. In some embodiments, the width W2 of the second side lap 32 is 150 mm to 190 mm. In some embodiments, the width W2 of the second side lap 32 is 150 mm to 180 mm. In some embodiments, the width W2 of the second side lap 32 is 150 mm to 170 mm. In some embodiments, the width W2 of the second side lap 32 is 150 mm to 160 mm.

In some embodiments, the width W2 of the second side lap 32 is 160 mm to 200 mm. In some embodiments, the width W2 of the second side lap 32 is 160 mm to 190 mm. In some embodiments, the width W2 of the second side lap 32 is 160 mm to 180 mm. In some embodiments, the width W2 of the second side lap 32 is 160 mm to 170 mm. In some embodiments, the width W2 of the second side lap 32 is 170 mm to 200 mm. In some embodiments, the width W2 of the second side lap 32 is 170 mm to 190 mm. In some embodiments, the width W2 of the second side lap 32 is 170 mm to 180 mm. In some embodiments, the width W2 of the second side lap 32 is 180 mm to 200 mm. In some embodiments, the width W2 of the second side lap 32 is 180 mm to 190 mm. In some embodiments, the width W2 of the second side lap 32 is 190 mm to 200 mm.

In some embodiments, the jumper module 10 includes a first junction box 38. In some embodiments, the first junction box 38 is located on the surface 34 of the first side lap 30. In some embodiments, the first junction box 38 is attached to the surface 34 by an adhesive. In other embodiments, the first junction box 38 is encapsulated by the first side lap 30. In some embodiments, the jumper module 10 includes a second junction box 40. In some embodiments, the second junction box 40 is located on the surface 36 of the second side lap 32. In some embodiments, the second junction box 40 is attached to the surface 36 by an adhesive. In other embodiments, the second junction box 40 is encapsulated by the second side lap 32. In certain embodiments, other electronic and electrical components may be attached to the first side lap 30 and/or the second side lap 32. In some embodiments, non-limiting examples of such electronic and electrical components include an electrical connector, a rapid shutdown device, an optimizer, and an inverter. In some embodiments, the electrical connector includes a flat wire connector.

Figure 6:
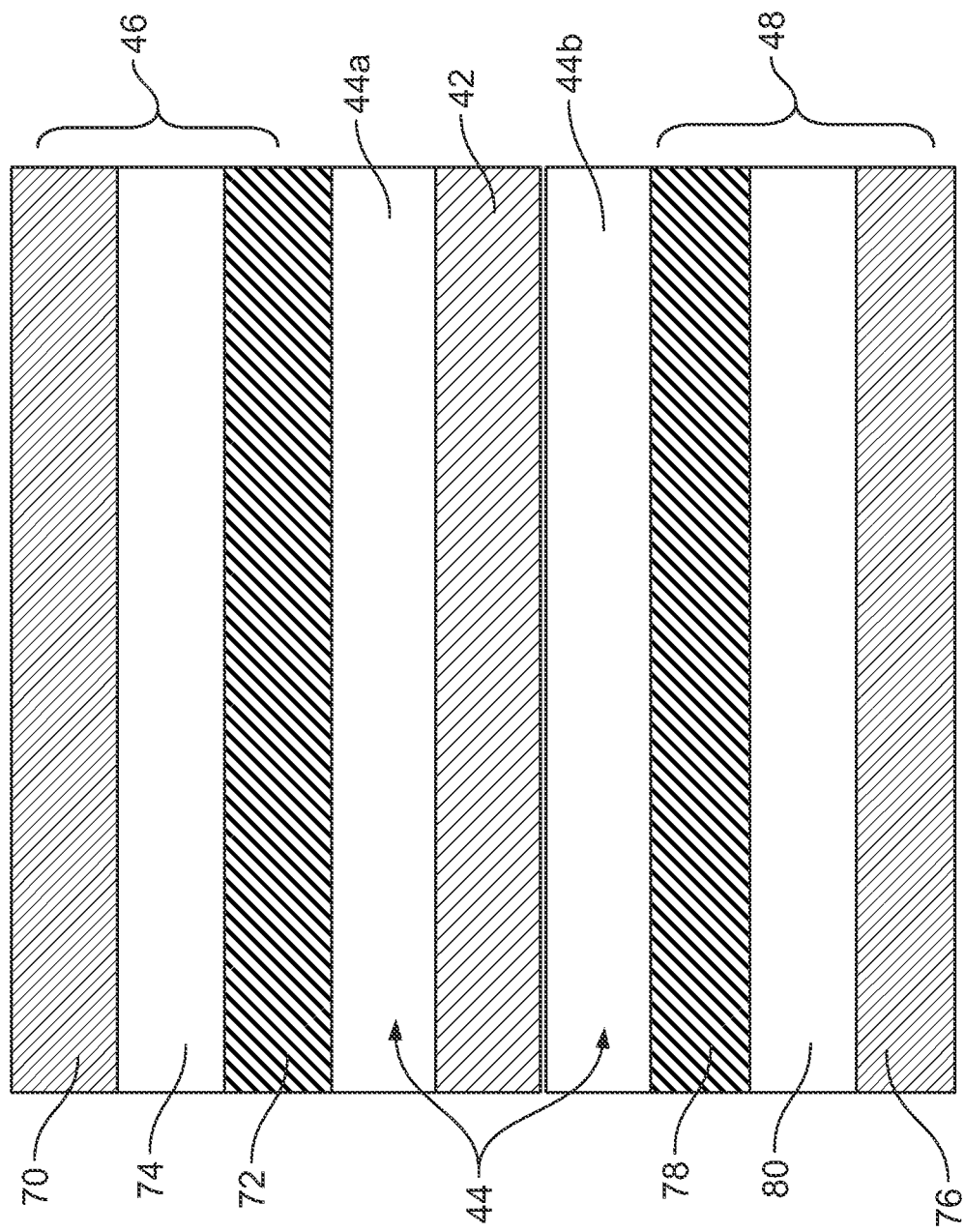
FIG. 6 is schematic view of the active portion of the jumper module shown in FIG. 5.

Referring to FIGS. 5 and 6, in some embodiments, the active portion 12 is a laminated structure. In some embodiments, the active portion 12 includes electrical bussing 42, an encapsulant 44 encapsulating the electrical bussing 42, a frontsheet 46 juxtaposed with the encapsulant 44, and a backsheet 48 juxtaposed with the encapsulant 44. As used herein, the terms "encapsulating" and "encapsulates" mean to partially or fully envelope or enclose, and with respect to certain embodiments of the jumper module 10, the electrical bussing 42 is fully enveloped by or enclosed within the encapsulant 44, or partially enveloped by or enclosed within the encapsulant 44. In some embodiments, the encapsulant 44 includes a first layer 44a and a second layer 44b.

In some embodiments, the electrical bussing 42 includes a first bus ribbon 50 extending from a first end 52 proximate to the first end 14 and a second end 54 proximate to the second end 16. In some embodiments, the first bus ribbon 50 includes a first terminal 56 located at the first end 52 and a second terminal 58 located at the second end 54. In some embodiments, the first terminal 56 is a positive terminal, while the second terminal 58 is a negative terminal. In other embodiments, the first terminal 56 is a negative terminal, while the second terminal 58 is a positive terminal.

In some embodiments, the electrical bussing 42 includes a second bus ribbon 60 extending from a first end 62 proximate to the first end 14 and a second end 64 proximate to the second end 16. In some embodiments, the second bus ribbon 60 includes a first terminal 66 located at the first end 62 and a second terminal 68 located at the second end 64. In some embodiments, the first terminal 66 is a negative terminal, while the second terminal 68 is a positive terminal. In other embodiments, the first terminal 66 is a positive terminal, while the second terminal 68 is a negative terminal.

In some embodiments, the encapsulant 44 is composed of polyolefins, ethyl vinyl acetates, ionomers, silicones, poly vinyl butyral, epoxies, polyurethanes, or combinations/hybrids thereof. In some embodiments, the encapsulant 44 is composed of thermosetting polyolefin.

In some embodiments, the encapsulant 44 has a thickness of 0.4 mm to 1.8 mm. In other embodiments, the encapsulant 44 has a thickness of 0.4 mm to 1.7 mm. In other embodiments, the encapsulant 44 has a thickness of 0.4 mm to 1.6 mm. In other embodiments, the encapsulant 44 has a thickness of 0.4 mm to 1.5 mm. In other embodiments, the encapsulant 44 has a thickness of 0.4 mm to 1.4 mm. In other embodiments, the encapsulant 44 has a thickness of 0.4 mm to 1.3 mm. In other embodiments, the encapsulant 44 has a thickness of 0.4 mm to 1.2 mm. In other embodiments, the encapsulant 44 has a thickness of 0.4 mm to 1.1 mm. In other embodiments, the encapsulant 44 has a thickness of 0.4 mm to 1.0 mm. In other embodiments, the encapsulant 44 has a thickness of 0.4 mm to 0.9 mm. In other embodiments, the encapsulant 44 has a thickness of 0.4 mm to 0.8 mm. In other embodiments, the encapsulant 44 has a thickness of 0.4 mm to 0.7 mm. In other embodiments, the encapsulant 44 has a thickness of 0.4 mm to 0.6 mm. In other embodiments, the encapsulant 44 has a thickness of 0.4 mm to 0.5 mm.

In some embodiments, the encapsulant 44 has a thickness of 0.5 mm to 1.8 mm. In other embodiments, the encapsulant 44 has a thickness of 0.5 mm to 1.7 mm. In other embodiments, the encapsulant 44 has a thickness of 0.5 mm to 1.6 mm. In other embodiments, the encapsulant 44 has a thickness of 0.5 mm to 1.5 mm. In other embodiments, the encapsulant 44 has a thickness of 0.5 mm to 1.4 mm. In other embodiments, the encapsulant 44 has a thickness of 0.5 mm to 1.3 mm. In other embodiments, the encapsulant 44 has a thickness of 0.5 mm to 1.2 mm. In other embodiments, the encapsulant 44 has a thickness of 0.5 mm to 1.1 mm. In other embodiments, the encapsulant 44 has a thickness of 0.5 mm to 1.0 mm. In other embodiments, the encapsulant 44 has a thickness of 0.5 mm to 0.9 mm. In other embodiments, the encapsulant 44 has a thickness of 0.5 mm to 0.8 mm. In other embodiments, the encapsulant 44 has a thickness of 0.5 mm to 0.7 mm. In other embodiments, the encapsulant 44 has a thickness of 0.5 mm to 0.6 mm.

In some embodiments, the encapsulant 44 has a thickness of 0.6 mm to 1.8 mm. In other embodiments, the encapsulant 44 has a thickness of 0.6 mm to 1.7 mm. In other embodiments, the encapsulant 44 has a thickness of 0.6 mm to 1.6 mm. In other embodiments, the encapsulant 44 has a thickness of 0.6 mm to 1.5 mm. In other embodiments, the encapsulant 44 has a thickness of 0.6 mm to 1.4 mm. In other embodiments, the encapsulant 44 has a thickness of 0.6 mm to 1.3 mm. In other embodiments, the encapsulant 44 has a thickness of 0.6 mm to 1.2 mm. In other embodiments, the encapsulant 44 has a thickness of 0.6 mm to 1.1 mm. In other embodiments, the encapsulant 44 has a thickness of 0.6 mm to 1.0 mm. In other embodiments, the encapsulant 44 has a thickness of 0.6 mm to 0.9 mm. In other embodiments, the encapsulant 44 has a thickness of 0.6 mm to 0.8 mm. In other embodiments, the encapsulant 44 has a thickness of 0.6 mm to 0.7 mm.

In some embodiments, the encapsulant 44 has a thickness of 0.7 mm to 1.8 mm. In other embodiments, the encapsulant 44 has a thickness of 0.7 mm to 1.7 mm. In other embodiments, the encapsulant 44 has a thickness of 0.7 mm to 1.6 mm. In other embodiments, the encapsulant 44 has a thickness of 0.7 mm to 1.5 mm. In other embodiments, the encapsulant 44 has a thickness of 0.7 mm to 1.4 mm. In other embodiments, the encapsulant 44 has a thickness of 0.7 mm to 1.3 mm. In other embodiments, the encapsulant 44 has a thickness of 0.7 mm to 1.2 mm. In other embodiments, the encapsulant 44 has a thickness of 0.7 mm to 1.1 mm. In other embodiments, the encapsulant 44 has a thickness of 0.7 mm to 1.0 mm. In other embodiments, the encapsulant 44 has a thickness of 0.7 mm to 0.9 mm. In other embodiments, the encapsulant 44 has a thickness of 0.7 mm to 0.8 mm.

In some embodiments, the encapsulant 44 has a thickness of 0.8 mm to 1.8 mm. In other embodiments, the encapsulant 44 has a thickness of 0.8 mm to 1.7 mm. In other embodiments, the encapsulant 44 has a thickness of 0.8 mm to 1.6 mm. In other embodiments, the encapsulant 44 has a thickness of 0.8 mm to 1.5 mm. In other embodiments, the encapsulant 44 has a thickness of 0.8 mm to 1.4 mm. In other embodiments, the encapsulant 44 has a thickness of 0.8 mm to 1.3 mm. In other embodiments, the encapsulant 44 has a thickness of 0.8 mm to 1.2 mm. In other embodiments, the encapsulant 44 has a thickness of 0.8 mm to 1.1 mm. In other embodiments, the encapsulant 44 has a thickness of 0.8 mm to 1.0 mm. In other embodiments, the encapsulant 44 has a thickness of 0.8 mm to 0.9 mm.

In some embodiments, the encapsulant 44 has a thickness of 0.9 mm to 1.8 mm. In other embodiments, the encapsulant 44 has a thickness of 0.9 mm to 1.7 mm. In other embodiments, the encapsulant 44 has a thickness of 0.9 mm to 1.6 mm. In other embodiments, the encapsulant 44 has a thickness of 0.9 mm to 1.5 mm. In other embodiments, the encapsulant 44 has a thickness of 0.9 mm to 1.4 mm. In other embodiments, the encapsulant 44 has a thickness of 0.9 mm to 1.3 mm. In other embodiments, the encapsulant 44 has a thickness of 0.9 mm to 1.2 mm. In other embodiments, the encapsulant 44 has a thickness of 0.9 mm to 1.1 mm. In other embodiments, the encapsulant 44 has a thickness of 0.9 mm to 1.0 mm.

In some embodiments, the encapsulant 44 has a thickness of 1.0 mm to 1.8 mm. In other embodiments, the encapsulant 44 has a thickness of 1.0 mm to 1.7 mm. In other embodiments, the encapsulant 44 has a thickness of 1.0 mm to 1.6 mm. In other embodiments, the encapsulant 44 has a thickness of 1.0 mm to 1.5 mm. In other embodiments, the encapsulant 44 has a thickness of 1.0 mm to 1.4 mm. In other embodiments, the encapsulant 44 has a thickness of 1.0 mm to 1.3 mm. In other embodiments, the encapsulant 44 has a thickness of 1.0 mm to 1.2 mm. In other embodiments, the encapsulant 44 has a thickness of 1.0 mm to 1.1 mm.

In some embodiments, the encapsulant 44 has a thickness of 1.1 mm to 1.8 mm. In other embodiments, the encapsulant 44 has a thickness of 1.1 mm to 1.7 mm. In other embodiments, the encapsulant 44 has a thickness of 1.1 mm to 1.6 mm. In other embodiments, the encapsulant 44 has a thickness of 1.1 mm to 1.5 mm. In other embodiments, the encapsulant 44 has a thickness of 1.1 mm to 1.4 mm. In other embodiments, the encapsulant 44 has a thickness of 1.1 mm to 1.3 mm. In other embodiments, the encapsulant 44 has a thickness of 1.1 mm to 1.2 mm.

In some embodiments, the encapsulant 44 has a thickness of 1.2 mm to 1.8 mm. In other embodiments, the encapsulant 44 has a thickness of 1.2 mm to 1.7 mm. In other embodiments, the encapsulant 44 has a thickness of 1.2 mm to 1.6 mm. In other embodiments, the encapsulant 44 has a thickness of 1.2 mm to 1.5 mm. In other embodiments, the encapsulant 44 has a thickness of 1.2 mm to 1.4 mm. In other embodiments, the encapsulant 44 has a thickness of 1.2 mm to 1.3 mm.

In some embodiments, the encapsulant 44 has a thickness of 1.3 mm to 1.8 mm. In other embodiments, the encapsulant 44 has a thickness of 1.3 mm to 1.7 mm. In other embodiments, the encapsulant 44 has a thickness of 1.3 mm to 1.6 mm. In other embodiments, the encapsulant 44 has a thickness of 1.3 mm to 1.5 mm. In other embodiments, the encapsulant 44 has a thickness of 1.3 mm to 1.4 mm.

In some embodiments, the encapsulant 44 has a thickness of 1.4 mm to 1.8 mm. In other embodiments, the encapsulant 44 has a thickness of 1.4 mm to 1.7 mm. In other embodiments, the encapsulant 44 has a thickness of 1.4 mm to 1.6 mm. In other embodiments, the encapsulant 44 has a thickness of 1.4 mm to 1.5 mm.

In some embodiments, the encapsulant 44 has a thickness of 1.5 mm to 1.8 mm. In other embodiments, the encapsulant 44 has a thickness of 1.5 mm to 1.7 mm. In other embodiments, the encapsulant 44 has a thickness of 1.5 mm to 1.6 mm. In some embodiments, the encapsulant 44 has a thickness of 1.6 mm to 1.8 mm. In other embodiments, the encapsulant 44 has a thickness of 1.6 mm to 1.7 mm. In some embodiments, the encapsulant 44 has a thickness of 1.7 mm to 1.8 mm. In some embodiments, the encapsulant 44 has a thickness of 0.4 mm. In some embodiments, the encapsulant 44 has a thickness of 0.5 mm. In some embodiments, the encapsulant 44 has a thickness of 0.6 mm. In some embodiments, the encapsulant 44 has a thickness of 0.7 mm. In some embodiments, the encapsulant 44 has a thickness of 0.8 mm. In some embodiments, the encapsulant 44 has a thickness of 0.9 mm. In some embodiments, the encapsulant 44 has a thickness of 1.0 mm. In some embodiments, the encapsulant 44 has a thickness of 1.1 mm. In some embodiments, the encapsulant 44 has a thickness of 1.2 mm. In some embodiments, the encapsulant 44 has a thickness of 1.3 mm. In some embodiments, the encapsulant 44 has a thickness of 1.4 mm. In some embodiments, the encapsulant 44 has a thickness of 1.5 mm. In some embodiments, the encapsulant 44 has a thickness of 1.6 mm. In some embodiments, the encapsulant 44 has a thickness of 1.7 mm. In some embodiments, the encapsulant 44 has a thickness of 1.8 mm.

In some embodiments, the first layer 44a of the encapsulant 44 has a thickness of 0.2 mm to 0.9 mm. In other embodiments, the first layer 44a of the encapsulant 44 has a thickness of 0.2 mm to 0.8 mm. In other embodiments, the first layer 44a of the encapsulant 44 has a thickness of 0.2 mm to 0.7 mm. In other embodiments, the first layer 44a of the encapsulant 44 has a thickness of 0.2 mm to 0.6 mm. In other embodiments, the first layer 44a of the encapsulant 44 has a thickness of 0.2 mm to 0.5 mm. In other embodiments, the first layer 44a of the encapsulant 44 has a thickness of 0.2 mm to 0.4 mm. In other embodiments, the first layer 44a of the encapsulant 44 has a thickness of 0.2 mm to 0.3 mm.

In some embodiments, the first layer 44a of the encapsulant 44 has a thickness of 0.3 mm to 0.9 mm. In other embodiments, the first layer 44a of the encapsulant 44 has a thickness of 0.3 mm to 0.8 mm. In other embodiments, the first layer 44a of the encapsulant 44 has a thickness of 0.3 mm to 0.7 mm. In other embodiments, the first layer 44a of the encapsulant 44 has a thickness of 0.3 mm to 0.6 mm. In other embodiments, the first layer 44a of the encapsulant 44 has a thickness of 0.3 mm to 0.5 mm. In other embodiments, the first layer 44a of the encapsulant 44 has a thickness of 0.3 mm to 0.4 mm.

In some embodiments, the first layer 44a of the encapsulant 44 has a thickness of 0.4 mm to 0.9 mm. In other embodiments, the first layer 44a of the encapsulant 44 has a thickness of 0.4 mm to 0.8 mm. In other embodiments, the first layer 44a of the encapsulant 44 has a thickness of 0.4 mm to 0.7 mm. In other embodiments, the first layer 44a of the encapsulant 44 has a thickness of 0.4 mm to 0.6 mm. In other embodiments, the first layer 44a of the encapsulant 44 has a thickness of 0.4 mm to 0.5 mm.

In some embodiments, the first layer 44a of the encapsulant 44 has a thickness of 0.5 mm to 0.9 mm. In other embodiments, the first layer 44a of the encapsulant 44 has a thickness of 0.5 mm to 0.8 mm. In other embodiments, the first layer 44a of the encapsulant 44 has a thickness of 0.5 mm to 0.7 mm. In other embodiments, the first layer 44a of the encapsulant 44 has a thickness of 0.5 mm to 0.6 mm. In some embodiments, the first layer 44a of the encapsulant 44 has a thickness of 0.6 mm to 0.9 mm. In other embodiments, the first layer 44a of the encapsulant 44 has a thickness of 0.6 mm to 0.8 mm. In other embodiments, the first layer 44a of the encapsulant 44 has a thickness of 0.6 mm to 0.7 mm. In some embodiments, the first layer 44a of the encapsulant 44 has a thickness of 0.7 mm to 0.9 mm. In other embodiments, the first layer 44a of the encapsulant 44 has a thickness of 0.7 mm to 0.8 mm. In some embodiments, the first layer 44a of the encapsulant 44 has a thickness of 0.8 mm to 0.9 mm.

In some embodiments, the second layer 44b of the encapsulant 44 has a thickness of 0.2 mm to 0.9 mm. In other embodiments, the second layer 44b of the encapsulant 44 has a thickness of 0.2 mm to 0.8 mm. In other embodiments, the second layer 44b of the encapsulant 44 has a thickness of 0.2 mm to 0.7 mm. In other embodiments, the second layer 44b of the encapsulant 44 has a thickness of 0.2 mm to 0.6 mm. In other embodiments, the second layer 44b of the encapsulant 44 has a thickness of 0.2 mm to 0.5 mm. In other embodiments, the second layer 44b of the encapsulant 44 has a thickness of 0.2 mm to 0.4 mm. In other embodiments, the second layer 44b of the encapsulant 44 has a thickness of 0.2 mm to 0.3 mm.

In some embodiments, the second layer 44b of the encapsulant 44 has a thickness of 0.3 mm to 0.9 mm. In other embodiments, the second layer 44b of the encapsulant 44 has a thickness of 0.3 mm to 0.8 mm. In other embodiments, the second layer 44b of the encapsulant 44 has a thickness of 0.3 mm to 0.7 mm. In other embodiments, the second layer 44b of the encapsulant 44 has a thickness of 0.3 mm to 0.6 mm. In other embodiments, the second layer 44b of the encapsulant 44 has a thickness of 0.3 mm to 0.5 mm. In other embodiments, the second layer 44b of the encapsulant 44 has a thickness of 0.3 mm to 0.4 mm.

In some embodiments, the second layer 44b of the encapsulant 44 has a thickness of 0.4 mm to 0.9 mm. In other embodiments, the second layer 44b of the encapsulant 44 has a thickness of 0.4 mm to 0.8 mm. In other embodiments, the second layer 44b of the encapsulant 44 has a thickness of 0.4 mm to 0.7 mm. In other embodiments, the second layer 44b of the encapsulant 44 has a thickness of 0.4 mm to 0.6 mm. In other embodiments, the second layer 44b of the encapsulant 44 has a thickness of 0.4 mm to 0.5 mm.

In some embodiments, the second layer 44b of the encapsulant 44 has a thickness of 0.5 mm to 0.9 mm. In other embodiments, the second layer 44b of the encapsulant 44 has a thickness of 0.5 mm to 0.8 mm. In other embodiments, the second layer 44b of the encapsulant 44 has a thickness of 0.5 mm to 0.7 mm. In other embodiments, the second layer 44b of the encapsulant 44 has a thickness of 0.5 mm to 0.6 mm. In some embodiments, the second layer 44b of the encapsulant 44 has a thickness of 0.6 mm to 0.9 mm. In other embodiments, the second layer 44b of the encapsulant 44 has a thickness of 0.6 mm to 0.8 mm. In other embodiments, the second layer 44b of the encapsulant 44 has a thickness of 0.6 mm to 0.7 mm. In some embodiments, the second layer 44b of the encapsulant 44 has a thickness of 0.7 mm to 0.9 mm. In other embodiments, the second layer 44b of the encapsulant 44 has a thickness of 0.7 mm to 0.8 mm. In some embodiments, the second layer 44b of the encapsulant 44 has a thickness of 0.8 mm to 0.9 mm.

In some embodiments, the thickness of the first layer 44a is equal to the thickness of the second layer 44b. In other embodiments, the thickness of the first layer 44a is different from the thickness of the second layer 44b.

In some embodiments, the frontsheet 46 includes an upper layer 70 and a polymer layer 72 attached to the upper layer 70. In some embodiments, the frontsheet 46 is juxtaposed with the first layer 44a of the encapsulant 44. In some embodiments, the polymer layer 72 is attached to the upper layer 70 by an adhesive layer 74. In some embodiments, the adhesive layer 74 may include polyvinyl butyrate, acrylic, silicone, or polycarbonate. In other embodiments, the adhesive layer 74 may include pressure sensitive adhesives. In other embodiments, the polymer layer 72 is attached to the upper layer 70 by thermal bonding. In other embodiments, the frontsheet 46 includes at least one of the upper layer 70 or the polymer layer 72. In some embodiments, the upper layer 70 is an upper, sun facing-side surface of the jumper module 10.

In some embodiments, the upper layer 70 includes thermoplastic polyolefin (TPO). In some embodiments, the upper layer 70 includes a single ply TPO roofing membrane. In some embodiments, the upper layer 70 is colored black. In other embodiments, non-limiting examples of TPO membranes are disclosed in U.S. Pat. No. 9,359,014 to Yang et al., which is incorporated by reference herein in its entirety.

In other embodiments, the upper layer 70 includes polyvinyl chloride (PVC). In some embodiments, the upper layer 70 includes ethylene propylene diene monomer (EPDM) rubber. In some embodiments, the upper layer 70 includes a flame retardant additive. In some embodiments, the flame retardant additive may be clays, nanoclays, silicas, carbon black, metal hydroxides such as aluminum hydroxide, metal foils, graphite, and combinations thereof.

In some embodiments, the upper layer 70 has a thickness of 2.5 mm to 4 mm. In other embodiments, the upper layer 70 has a thickness of 2.5 mm to 3.5 mm. In other embodiments, the upper layer 70 has a thickness of 2.5 mm to 3 mm. In other embodiments, the upper layer 70 has a thickness of 3 mm to 4 mm. In other embodiments, the upper layer 70 has a thickness of 3.5 mm to 4 mm. In other embodiments, the upper layer 70 has a thickness of 2.6 mm to 3.5 mm. In other embodiments, the upper layer 70 has a thickness of 2.7 mm to 3.5 mm. In other embodiments, the upper layer 70 has a thickness of 2.8 mm to 3.5 mm. In other embodiments, the upper layer 70 has a thickness of 2.9 mm to 3.5 mm. In other embodiments, the upper layer 70 has a thickness of 3 mm to 3.5 mm. In other embodiments, the upper layer 70 has a thickness of 3.1 mm to 3.5 mm. In other embodiments, the upper layer 70 has a thickness of 3.2 mm to 3.5 mm. In other embodiments, the upper layer 70 has a thickness of 3.3 mm to 3.5 mm. In other embodiments, the upper layer 70 has a thickness of 3.4 mm to 3.5 mm. In other embodiments, the upper layer 70 has a thickness of 2.5 mm to 3.4 mm. In other embodiments, the upper layer 70 has a thickness of 2.5 mm to 3.3 mm. In other embodiments, the upper layer 70 has a thickness of 2.5 mm to 3.2 mm. In other embodiments, the upper layer 70 has a thickness of 2.5 mm to 3.1 mm. In other embodiments, the upper layer 70 has a thickness of 2.5 mm to 2.9 mm. In other embodiments, the upper layer 70 has a thickness of 2.5 mm to 2.8 mm. In other embodiments, the upper layer 70 has a thickness of 2.5 mm to 2.7 mm. In other embodiments, the upper layer 70 has a thickness of 2.5 mm to 2.6 mm.

In other embodiments, the upper layer 70 has a thickness of 2.5 mm. In other embodiments, the upper layer 70 has a thickness of 2.6 mm. In other embodiments, the upper layer 70 has a thickness of 2.7 mm. In other embodiments, the upper layer 70 has a thickness of 2.8 mm. In other embodiments, the upper layer 70 has a thickness of 2.9 mm. In other embodiments, the upper layer 70 has a thickness of 3 mm. In other embodiments, the upper layer 70 has a thickness of 3.1 mm. In other embodiments, the upper layer 70 has a thickness of 3.2 mm. In other embodiments, the upper layer 70 has a thickness of 3.3 mm. In other embodiments, the upper layer 70 has a thickness of 3.4 mm. In other embodiments, the upper layer 70 has a thickness of 3.5 mm. In other embodiments, the upper layer 70 has a thickness of 3.6 mm. In other embodiments, the upper layer 70 has a thickness of 3.7 mm. In other embodiments, the upper layer 70 has a thickness of 3.8 mm. In other embodiments, the upper layer 70 has a thickness of 3.9 mm. In other embodiments, the upper layer 70 has a thickness of 4 mm.

In some embodiments, the adhesive layer 74 includes thermosetting polyolefin, thermosetting polyolefin encapsulant material, thermosetting ethylene-vinyl acetate (EVA), EVA encapsulants, thermoplastic olefin, thermoplastic polyolefin (TOP) or hybrids/combinations thereof.

In some embodiments, the adhesive layer 74 has a thickness of 1 μm to 900 μm. In some embodiments, the adhesive layer 74 has a thickness of 1 μm to 900 μm. In some embodiments, the adhesive layer 74 has a thickness of 1 μm to 850 μm. In some embodiments, the adhesive layer 74 has a thickness of 1 μm to 800 μm. In some embodiments, the adhesive layer 74 has a thickness of 1 μm to 750 μm. In some embodiments, the adhesive layer 74 has a thickness of 1 μm to 700 μm. In some embodiments, the adhesive layer 74 has a thickness of 1 μm to 650 μm. In some embodiments, the adhesive layer 74 has a thickness of 1 μm to 600 μm. In some embodiments, the adhesive layer 74 has a thickness of 1 μm to 550 μm. In some embodiments, the adhesive layer 74 has a thickness of 1 μm to 500 μm. In some embodiments, the adhesive layer 74 has a thickness of 1 μm to 450 μm. In some embodiments, the adhesive layer 74 has a thickness of 1 μm to 400 μm. In some embodiments, the adhesive layer 74 has a thickness of 1 μm to 350 μm. In some embodiments, the adhesive layer 74 has a thickness of 1 μm to 300 μm. In some embodiments, the adhesive layer 74 has a thickness of 1 μm to 250 μm. In some embodiments, the adhesive layer 74 has a thickness of 1 μm to 200 μm. In some embodiments, the adhesive layer 74 has a thickness of 1 μm to 150 μm. In some embodiments, the adhesive layer 74 has a thickness of 1 μm to 100 μm. In some embodiments, the adhesive layer 74 has a thickness of 1 μm to 50 μm.

In some embodiments, the adhesive layer 74 has a thickness of 50 μm to 900 μm. In some embodiments, the adhesive layer 74 has a thickness of 50 μm to 850 μm. In some embodiments, the adhesive layer 74 has a thickness of 50 μm to 800 μm. In some embodiments, the adhesive layer 74 has a thickness of 50 μm to 750 μm. In some embodiments, the adhesive layer 74 has a thickness of 50 μm to 700 μm. In some embodiments, the adhesive layer 74 has a thickness of 50 μm to 650 μm. In some embodiments, the adhesive layer 74 has a thickness of 50 μm to 600 μm. In some embodiments, the adhesive layer 74 has a thickness of 50 μm to 550 μm. In some embodiments, the adhesive layer 74 has a thickness of 50 μm to 500 μm. In some embodiments, the adhesive layer 74 has a thickness of 50 μm to 450 μm. In some embodiments, the adhesive layer 74 has a thickness of 50 μm to 400 μm. In some embodiments, the adhesive layer 74 has a thickness of 50 μm to 350 μm. In some embodiments, the adhesive layer 74 has a thickness of 50 μm to 300 μm. In some embodiments, the adhesive layer 74 has a thickness of 50 μm to 250 μm. In some embodiments, the adhesive layer 74 has a thickness of 50 μm to 200 μm. In some embodiments, the adhesive layer 74 has a thickness of 50 μm to 150 μm. In some embodiments, the adhesive layer 74 has a thickness of 50 μm to 100 μm.

In some embodiments, the adhesive layer 74 has a thickness of 100 μm to 900 μm. In some embodiments, the adhesive layer 74 has a thickness of 100 μm to 850 μm. In some embodiments, the adhesive layer 74 has a thickness of 100 μm to 800 μm. In some embodiments, the adhesive layer 74 has a thickness of 100 μm to 750 μm. In some embodiments, the adhesive layer 74 has a thickness of 100 μm to 700 μm. In some embodiments, the adhesive layer 74 has a thickness of 100 μm to 650 μm. In some embodiments, the adhesive layer 74 has a thickness of 100 μm to 600 μm. In some embodiments, the adhesive layer 74 has a thickness of 100 μm to 550 μm. In some embodiments, the adhesive layer 74 has a thickness of 100 μm to 500 μm. In some embodiments, the adhesive layer 74 has a thickness of 100 μm to 450 μm. In some embodiments, the adhesive layer 74 has a thickness of 100 μm to 400 μm. In some embodiments, the adhesive layer 74 has a thickness of 100 μm to 350 μm. In some embodiments, the adhesive layer 74 has a thickness of 100 μm to 300 μm. In some embodiments, the adhesive layer 74 has a thickness of 100 μm to 250 μm. In some embodiments, the adhesive layer 74 has a thickness of 100 μm to 200 μm. In some embodiments, the adhesive layer 74 has a thickness of 100 μm to 150 μm.

In some embodiments, the adhesive layer 74 has a thickness of 150 μm to 900 μm. In some embodiments, the adhesive layer 74 has a thickness of 150 μm to 850 μm. In some embodiments, the adhesive layer 74 has a thickness of 150 μm to 800 μm. In some embodiments, the adhesive layer 74 has a thickness of 150 μm to 750 μm. In some embodiments, the adhesive layer 74 has a thickness of 150 μm to 700 μm. In some embodiments, the adhesive layer 74 has a thickness of 150 μm to 650 μm. In some embodiments, the adhesive layer 74 has a thickness of 150 μm to 600 μm. In some embodiments, the adhesive layer 74 has a thickness of 150 μm to 550 μm. In some embodiments, the adhesive layer 74 has a thickness of 150 μm to 500 μm. In some embodiments, the adhesive layer 74 has a thickness of 150 μm to 450 μm. In some embodiments, the adhesive layer 74 has a thickness of 150 μm to 400 μm. In some embodiments, the adhesive layer 74 has a thickness of 150 μm to 350 μm. In some embodiments, the adhesive layer 74 has a thickness of 150 μm to 300 μm. In some embodiments, the adhesive layer 74 has a thickness of 150 μm to 250 μm. In some embodiments, the adhesive layer 74 has a thickness of 150 μm to 200 μm.

In some embodiments, the adhesive layer 74 has a thickness of 200 μm to 900 μm. In some embodiments, the adhesive layer 74 has a thickness of 200 μm to 850 μm. In some embodiments, the adhesive layer 74 has a thickness of 200 μm to 800 μm. In some embodiments, the adhesive layer 74 has a thickness of 200 μm to 750 μm. In some embodiments, the adhesive layer 74 has a thickness of 200 μm to 700 μm. In some embodiments, the adhesive layer 74 has a thickness of 200 μm to 650 μm. In some embodiments, the adhesive layer 74 has a thickness of 200 μm to 600 μm. In some embodiments, the adhesive layer 74 has a thickness of 200 μm to 550 μm. In some embodiments, the adhesive layer 74 has a thickness of 200 μm to 500 μm. In some embodiments, the adhesive layer 74 has a thickness of 200 μm to 450 μm. In some embodiments, the adhesive layer 74 has a thickness of 200 μm to 400 μm. In some embodiments, the adhesive layer 74 has a thickness of 200 μm to 350 μm. In some embodiments, the adhesive layer 74 has a thickness of 200 μm to 300 μm. In some embodiments, the adhesive layer 74 has a thickness of 200 μm to 250 μm.

In some embodiments, the adhesive layer 74 has a thickness of 250 μm to 900 μm. In some embodiments, the adhesive layer 74 has a thickness of 250 μm to 850 μm. In some embodiments, the adhesive layer 74 has a thickness of 250 μm to 800 μm. In some embodiments, the adhesive layer 74 has a thickness of 250 μm to 750 μm. In some embodiments, the adhesive layer 74 has a thickness of 250 μm to 700 µm. In some embodiments, the adhesive layer 74 has a thickness of 250 µm to 650 µm. In some embodiments, the adhesive layer 74 has a thickness of 250 µm to 600 µm. In some embodiments, the adhesive layer 74 has a thickness of 250 µm to 550 µm. In some embodiments, the adhesive layer 74 has a thickness of 250 µm to 500 µm. In some embodiments, the adhesive layer 74 has a thickness of 250 µm to 450 µm. In some embodiments, the adhesive layer 74 has a thickness of 250 µm to 400 µm. In some embodiments, the adhesive layer 74 has a thickness of 250 µm to 350 µm. In some embodiments, the adhesive layer 74 has a thickness of 250 µm to 300 µm.

In some embodiments, the adhesive layer 74 has a thickness of 300 µm to 900 µm. In some embodiments, the adhesive layer 74 has a thickness of 300 µm to 850 µm. In some embodiments, the adhesive layer 74 has a thickness of 300 µm to 800 µm. In some embodiments, the adhesive layer 74 has a thickness of 300 µm to 750 µm. In some embodiments, the adhesive layer 74 has a thickness of 300 µm to 700 µm. In some embodiments, the adhesive layer 74 has a thickness of 300 µm to 650 µm. In some embodiments, the adhesive layer 74 has a thickness of 300 µm to 600 µm. In some embodiments, the adhesive layer 74 has a thickness of 300 µm to 550 µm. In some embodiments, the adhesive layer 74 has a thickness of 300 µm to 500 µm. In some embodiments, the adhesive layer 74 has a thickness of 300 µm to 450 µm. In some embodiments, the adhesive layer 74 has a thickness of 300 µm to 400 µm. In some embodiments, the adhesive layer 74 has a thickness of 300 µm to 350 µm.

In some embodiments, the adhesive layer 74 has a thickness of 350 µm to 900 µm. In some embodiments, the adhesive layer 74 has a thickness of 350 µm to 850 µm. In some embodiments, the adhesive layer 74 has a thickness of 350 µm to 800 µm. In some embodiments, the adhesive layer 74 has a thickness of 350 µm to 750 µm. In some embodiments, the adhesive layer 74 has a thickness of 350 µm to 700 µm. In some embodiments, the adhesive layer 74 has a thickness of 350 µm to 650 µm. In some embodiments, the adhesive layer 74 has a thickness of 350 µm to 600 µm. In some embodiments, the adhesive layer 74 has a thickness of 350 µm to 550 µm. In some embodiments, the adhesive layer 74 has a thickness of 350 µm to 500 µm. In some embodiments, the adhesive layer 74 has a thickness of 350 µm to 450 µm. In some embodiments, the adhesive layer 74 has a thickness of 350 µm to 400 µm.

In some embodiments, the adhesive layer 74 has a thickness of 400 µm to 900 µm. In some embodiments, the adhesive layer 74 has a thickness of 400 µm to 850 µm. In some embodiments, the adhesive layer 74 has a thickness of 400 µm to 800 µm. In some embodiments, the adhesive layer 74 has a thickness of 400 µm to 750 µm. In some embodiments, the adhesive layer 74 has a thickness of 400 µm to 700 µm. In some embodiments, the adhesive layer 74 has a thickness of 400 µm to 650 µm. In some embodiments, the adhesive layer 74 has a thickness of 400 µm to 600 µm. In some embodiments, the adhesive layer 74 has a thickness of 400 µm to 550 µm. In some embodiments, the adhesive layer 74 has a thickness of 400 µm to 500 µm. In some embodiments, the adhesive layer 74 has a thickness of 400 µm to 450 µm.

In some embodiments, the adhesive layer 74 has a thickness of 450 µm to 900 µm. In some embodiments, the adhesive layer 74 has a thickness of 450 µm to 850 µm. In some embodiments, the adhesive layer 74 has a thickness of 450 µm to 800 µm. In some embodiments, the adhesive layer 74 has a thickness of 450 µm to 750 µm. In some embodiments, the adhesive layer 74 has a thickness of 450 µm to 700 µm. In some embodiments, the adhesive layer 74 has a thickness of 450 µm to 650 µm. In some embodiments, the adhesive layer 74 has a thickness of 450 µm to 600 µm. In some embodiments, the adhesive layer 74 has a thickness of 450 µm to 550 µm. In some embodiments, the adhesive layer 74 has a thickness of 450 µm to 500 µm.

In some embodiments, the adhesive layer 74 has a thickness of 500 µm to 900 µm. In some embodiments, the adhesive layer 74 has a thickness of 500 µm to 850 µm. In some embodiments, the adhesive layer 74 has a thickness of 500 µm to 800 µm. In some embodiments, the adhesive layer 74 has a thickness of 500 µm to 750 µm. In some embodiments, the adhesive layer 74 has a thickness of 500 µm to 700 µm. In some embodiments, the adhesive layer 74 has a thickness of 500 µm to 650 µm. In some embodiments, the adhesive layer 74 has a thickness of 500 µm to 600 µm. In some embodiments, the adhesive layer 74 has a thickness of 500 µm to 550 µm.

In some embodiments, the adhesive layer 74 has a thickness of 550 µm to 900 µm. In some embodiments, the adhesive layer 74 has a thickness of 550 µm to 850 µm. In some embodiments, the adhesive layer 74 has a thickness of 550 µm to 800 µm. In some embodiments, the adhesive layer 74 has a thickness of 550 µm to 750 µm. In some embodiments, the adhesive layer 74 has a thickness of 550 µm to 700 µm. In some embodiments, the adhesive layer 74 has a thickness of 550 µm to 650 µm. In some embodiments, the adhesive layer 74 has a thickness of 550 µm to 600 µm.

In some embodiments, the adhesive layer 74 has a thickness of 600 µm to 900 µm. In some embodiments, the adhesive layer 74 has a thickness of 600 µm to 850 µm. In some embodiments, the adhesive layer 74 has a thickness of 600 µm to 800 µm. In some embodiments, the adhesive layer 74 has a thickness of 600 µm to 750 µm. In some embodiments, the adhesive layer 74 has a thickness of 600 µm to 700 µm. In some embodiments, the adhesive layer 74 has a thickness of 600 µm to 650 µm.

In some embodiments, the adhesive layer 74 has a thickness of 650 µm to 900 µm. In some embodiments, the adhesive layer 74 has a thickness of 650 µm to 850 µm. In some embodiments, the adhesive layer 74 has a thickness of 650 µm to 800 µm. In some embodiments, the adhesive layer 74 has a thickness of 650 µm to 750 µm. In some embodiments, the adhesive layer 74 has a thickness of 650 µm to 700 µm. In some embodiments, the adhesive layer 74 has a thickness of 700 µm to 900 µm. In some embodiments, the adhesive layer 74 has a thickness of 700 µm to 850 µm. In some embodiments, the adhesive layer 74 has a thickness of 700 µm to 800 µm. In some embodiments, the adhesive layer 74 has a thickness of 700 µm to 750 µm. In some embodiments, the adhesive layer 74 has a thickness of 750 µm to 900 µm. In some embodiments, the adhesive layer 74 has a thickness of 750 µm to 850 µm. In some embodiments, the adhesive layer 74 has a thickness of 750 µm to 800 µm. In some embodiments, the adhesive layer 74 has a thickness of 800 µm to 900 µm. In some embodiments, the adhesive layer 74 has a thickness of 800 µm to 850 µm. In some embodiments, the adhesive layer 74 has a thickness of 850 µm to 900 µm.

In some embodiments, the adhesive layer 74 has a thickness of 1 µm. In some embodiments, the adhesive layer 74 has a thickness of 50 µm. In some embodiments, the adhesive layer 74 has a thickness of 100 µm. In some embodiments, the adhesive layer 74 has a thickness of 1 µm. In some embodiments, the adhesive layer 74 has a thickness of 150 µm. In some embodiments, the adhesive layer 74 has a thickness of 200 µm. In some embodiments, the adhesive layer 74 has a thickness of 250 μm. In some embodiments, the adhesive layer 74 has a thickness of 300 μm. In some embodiments, the adhesive layer 74 has a thickness of 350 μm. In some embodiments, the adhesive layer 74 has a thickness of 400 μm. In some embodiments, the adhesive layer 74 has a thickness of 450 μm. In some embodiments, the adhesive layer 74 has a thickness of 500 μm. In some embodiments, the adhesive layer 74 has a thickness of 550 μm. In some embodiments, the adhesive layer 74 has a thickness of 600 μm. In some embodiments, the adhesive layer 74 has a thickness of 650 μm. In some embodiments, the adhesive layer 74 has a thickness of 700 μm. In some embodiments, the adhesive layer 74 has a thickness of 750 μm. In some embodiments, the adhesive layer 74 has a thickness of 800 μm. In some embodiments, the adhesive layer 74 has a thickness of 850 μm. In some embodiments, the adhesive layer 74 has a thickness of 900 μm.

In some embodiments, the polymer layer 72 includes a fluoropolymer. In certain embodiments, the fluoropolymer may be ethylene tetrafluoroethylene (ETFE), fluoropolymer is polyvinylidene fluoride (PVDF), tetrafluoroethylene-hexafluoropropylene copolymers (FEP), and tetrafluoroethylene-hexafluoropropylene-vinylidene fluoride copolymers (THV), polyvinyl fluoride (PVF), or blends thereof. In some embodiments, the frontsheet includes fluoropolymers, acrylics, polyesters, silicones, polycarbonates, or combinations thereof. In other embodiments, the polymer layer 72 includes polyethylene terephthalate (PET), polyethylene naphthalate (PEN), polyetheretherketone (PEEK), polyaryletherketone (PAEK), polyarylate (PAR), polyetherimide (PEI), polyarylsulfone (PAS), polyethersulfone (PES), polyamideimide (PAI), polyphenylsulfone (PPSU), polyolefin, cyclic olefin copolymers (CPCs), or polyimide. In some embodiments, the polymer layer 72 includes a crosslinked polymeric material. In some embodiments, 50% to 99% of the polymer chains of the polymeric material are crosslinked.

In some embodiments, the polymer layer 72 has a thickness of 0.01 mm to 0.5 mm. In other embodiments, the polymer layer 72 has a thickness of 0.01 mm to 0.4 mm. In other embodiments, the polymer layer 72 has a thickness of 0.01 mm to 0.3 mm. In other embodiments, the polymer layer 72 has a thickness of 0.01 mm to 0.2 mm. In other embodiments, the polymer layer 72 has a thickness of 0.01 mm to 0.1 mm. In other embodiments, the polymer layer 72 has a thickness of 0.01 mm to 0.09 mm. In other embodiments, the polymer layer 72 has a thickness of 0.01 mm to 0.08 mm. In other embodiments, the polymer layer 72 has a thickness of 0.01 mm to 0.07 mm. In other embodiments, the polymer layer 72 has a thickness of 0.01 mm to 0.06 mm. In other embodiments, the polymer layer 72 has a thickness of 0.01 mm to 0.05 mm. In other embodiments, the polymer layer 72 has a thickness of 0.01 mm to 0.04 mm. In other embodiments, the polymer layer 72 has a thickness of 0.01 mm to 0.03 mm. In other embodiments, the polymer layer 72 has a thickness of 0.01 mm to 0.02 mm.

In other embodiments, the polymer layer 72 has a thickness of 0.01 mm to 0.4 mm. In other embodiments, the polymer layer 72 has a thickness of 0.02 mm to 0.4 mm. In other embodiments, the polymer layer 72 has a thickness of 0.03 mm to 0.4 mm. In other embodiments, the polymer layer 72 has a thickness of 0.04 mm to 0.4 mm. In other embodiments, the polymer layer 72 has a thickness of 0.05 mm to 0.4 mm. In other embodiments, the polymer layer 72 has a thickness of 0.06 mm to 0.4 mm. In other embodiments, the polymer layer 72 has a thickness of 0.07 mm to 0.4 mm. In other embodiments, the polymer layer 72 has a thickness of 0.08 mm to 0.4 mm. In other embodiments, the polymer layer 72 has a thickness of 0.09 mm to 0.4 mm. In other embodiments, the polymer layer 72 has a thickness of 0.1 mm to 0.4 mm. In other embodiments, the polymer layer 72 has a thickness of 0.15 mm to 0.4 mm. In other embodiments, the polymer layer 72 has a thickness of 0.2 mm to 0.4 mm. In other embodiments, the polymer layer 72 has a thickness of 0.25 mm to 0.4 mm. In other embodiments, the polymer layer 72 has a thickness of 0.3 mm to 0.4 mm. In other embodiments, the polymer layer 72 has a thickness of 0.35 mm to 0.4 mm.

In other embodiments, the polymer layer 72 has a thickness of 0.025 mm to 0.1 mm. In other embodiments, the polymer layer 72 has a thickness of 0.03 mm to 0.1 mm. In other embodiments, the polymer layer 72 has a thickness of 0.035 mm to 0.1 mm. In other embodiments, the polymer layer 72 has a thickness of 0.04 mm to 0.1 mm. In other embodiments, the polymer layer 72 has a thickness of 0.045 mm to 0.1 mm. In other embodiments, the polymer layer 72 has a thickness of 0.05 mm to 0.1 mm. In other embodiments, the polymer layer 72 has a thickness of 0.06 mm to 0.1 mm. In other embodiments, the polymer layer 72 has a thickness of 0.065 mm to 0.1 mm. In other embodiments, the polymer layer 72 has a thickness of 0.07 mm to 0.1 mm. In other embodiments, the polymer layer 72 has a thickness of 0.075 mm to 0.1 mm. In other embodiments, the polymer layer 72 has a thickness of 0.08 mm to 0.1 mm. In other embodiments, the polymer layer 72 has a thickness of 0.085 mm to 0.1 mm. In other embodiments, the polymer layer 72 has a thickness of 0.09 mm to 0.1 mm. In other embodiments, the polymer layer 72 has a thickness of 0.095 mm to 0.1 mm.

In some embodiments, the backsheet 48 includes a lower layer 76. In some embodiments, the backsheet 48 includes a polymer layer 78. In some embodiments, the lower layer 76 and the polymer layer 78 are attached to one another by an adhesive layer 80. In some embodiments, the adhesive layer 80 may include polyvinyl butyrate, acrylic, silicone, or polycarbonate. In other embodiments, the adhesive layer 80 may include pressure sensitive adhesives. In some embodiments, the adhesive layer 80 includes thermosetting polyolefin, thermosetting polyolefin encapsulant material, thermosetting ethylene-vinyl acetate (EVA), EVA encapsulants, thermoplastic olefin, thermoplastic polyolefin (TOP) or hybrids/combinations thereof. In other embodiments, the lower layer 76 is attached to the polymer layer 78 by thermal bonding. In other embodiments, the backsheet 48 includes at least one of the lower layer 76 or the polymer layer 78.

In some embodiments, the lower layer 76 is a lower surface of the jumper module 10 configured to face a roof deck on which the jumper module 10 is installed.

In some embodiments, the lower layer 76 includes thermoplastic polyolefin (TPO). In some embodiments, the lower layer 76 includes a single ply TPO roofing membrane. In some embodiments, the lower layer 76 is colored black. In other embodiments, non-limiting examples of TPO membranes are disclosed in U.S. Pat. No. 9,359,014 to Yang et al., which is incorporated by reference herein in its entirety.

In other embodiments, the lower layer 76 includes polyvinyl chloride. In some embodiments, the lower layer 76 includes ethylene propylene diene monomer (EPDM) rubber. In some embodiments, the lower layer 76 includes a flame retardant additive. In some embodiments, the flame retardant additive may be clays, nanoclays, silicas, carbon black, metal hydroxides such as aluminum hydroxide, metal foils, graphite, and combinations thereof.

In some embodiments, the lower layer 76 has a thickness of 2.5 mm to 4 mm. In other embodiments, the lower layer 76 has a thickness of 2.5 mm to 3.5 mm. In other embodiments, the lower layer 76 has a thickness of 2.5 mm to 3 mm. In other embodiments, the lower layer 76 has a thickness of 3 mm to 4 mm. In other embodiments, the lower layer 76 has a thickness of 3.5 mm to 4 mm. In other embodiments, the lower layer 76 has a thickness of 2.6 mm to 3.5 mm. In other embodiments, the lower layer 76 has a thickness of 2.7 mm to 3.5 mm. In other embodiments, the lower layer 76 has a thickness of 2.8 mm to 3.5 mm. In other embodiments, the lower layer 76 has a thickness of 2.9 mm to 3.5 mm. In other embodiments, the lower layer 76 has a thickness of 3 mm to 3.5 mm. In other embodiments, the lower layer 76 has a thickness of 3.1 mm to 3.5 mm. In other embodiments, the lower layer 76 has a thickness of 3.2 mm to 3.5 mm. In other embodiments, the lower layer 76 has a thickness of 3.3 mm to 3.5 mm. In other embodiments, the lower layer 76 has a thickness of 3.4 mm to 3.5 mm. In other embodiments, the lower layer 76 has a thickness of 2.5 mm to 3.4 mm. In other embodiments, the lower layer 76 has a thickness of 2.5 mm to 3.3 mm. In other embodiments, the lower layer 76 has a thickness of 2.5 mm to 3.2 mm. In other embodiments, the lower layer 76 has a thickness of 2.5 mm to 3.1 mm. In other embodiments, the lower layer 76 has a thickness of 2.5 mm to 2.9 mm. In other embodiments, the lower layer 76 has a thickness of 2.5 mm to 2.8 mm. In other embodiments, the lower layer 76 has a thickness of 2.5 mm to 2.7 mm. In other embodiments, the lower layer 76 has a thickness of 2.5 mm to 2.6 mm.

In other embodiments, the lower layer 76 has a thickness of 2.5 mm. In other embodiments, the lower layer 76 has a thickness of 2.6 mm. In other embodiments, the lower layer 76 has a thickness of 2.7 mm. In other embodiments, the lower layer 76 has a thickness of 2.8 mm. In other embodiments, the lower layer 76 has a thickness of 2.9 mm. In other embodiments, the lower layer 76 has a thickness of 3 mm. In other embodiments, the lower layer 76 has a thickness of 3.1 mm. In other embodiments, the lower layer 76 has a thickness of 3.2 mm. In other embodiments, the lower layer 76 has a thickness of 3.3 mm. In other embodiments, the lower layer 76 has a thickness of 3.4 mm. In other embodiments, the lower layer 76 has a thickness of 3.5 mm. In other embodiments, the lower layer 76 has a thickness of 3.6 mm. In other embodiments, the lower layer 76 has a thickness of 3.7 mm. In other embodiments, the lower layer 76 has a thickness of 3.8 mm. In other embodiments, the lower layer 76 has a thickness of 3.9 mm. In other embodiments, the lower layer 76 has a thickness of 4 mm.

In some embodiments, the polymer layer 78 includes a fluoropolymer. In certain embodiments, the fluoropolymer may be ethylene tetrafluoroethylene (ETFE), fluoropolymer is polyvinylidene fluoride (PVDF), tetrafluoroethylene-hexafluoropropylene copolymers (FEP), and tetrafluoroethylene-hexafluoropropylene-vinylidene fluoride copolymers (THV), polyvinyl fluoride (PVF), or blends thereof. In some embodiments, the frontsheet includes fluoropolymers, acrylics, polyesters, silicones, polycarbonates, or combinations thereof. In other embodiments, the polymer layer 78 includes polyethylene terephthalate (PET), polyethylene naphthalate (PEN), polyetheretherketone (PEEK), polyaryletherketone (PAEK), polyarylate (PAR), polyetherimide (PEI), polyarylsulfone (PAS), polyethersulfone (PES), polyamideimide (PAI), polyphenylsulfone (PPSU), polyolefin, cyclic olefin copolymers (CPCs), or polyimide. In some embodiments, the polymer layer 78 includes a crosslinked polymeric material. In some embodiments, 50% to 99% of the polymer chains of the polymeric material are crosslinked.

In some embodiments, the polymer layer 78 has a thickness of 0.01 mm to 0.5 mm. In other embodiments, the polymer layer 78 has a thickness of 0.01 mm to 0.4 mm. In other embodiments, the polymer layer 78 has a thickness of 0.01 mm to 0.3 mm. In other embodiments, the polymer layer 78 has a thickness of 0.01 mm to 0.2 mm. In other embodiments, the polymer layer 78 has a thickness of 0.01 mm to 0.1 mm. In other embodiments, the polymer layer 78 has a thickness of 0.01 mm to 0.09 mm. In other embodiments, the polymer layer 78 has a thickness of 0.01 mm to 0.08 mm. In other embodiments, the polymer layer 78 has a thickness of 0.01 mm to 0.07 mm. In other embodiments, the polymer layer 78 has a thickness of 0.01 mm to 0.06 mm. In other embodiments, the polymer layer 78 has a thickness of 0.01 mm to 0.05 mm. In other embodiments, the polymer layer 78 has a thickness of 0.01 mm to 0.04 mm. In other embodiments, the polymer layer 78 has a thickness of 0.01 mm to 0.03 mm. In other embodiments, the polymer layer 78 has a thickness of 0.01 mm to 0.02 mm.

In other embodiments, the polymer layer 78 has a thickness of 0.01 mm to 0.4 mm. In other embodiments, the polymer layer 78 has a thickness of 0.02 mm to 0.4 mm. In other embodiments, the polymer layer 78 has a thickness of 0.03 mm to 0.4 mm. In other embodiments, the polymer layer 78 has a thickness of 0.04 mm to 0.4 mm. In other embodiments, the polymer layer 78 has a thickness of 0.05 mm to 0.4 mm. In other embodiments, the polymer layer 78 has a thickness of 0.06 mm to 0.4 mm. In other embodiments, the polymer layer 78 has a thickness of 0.07 mm to 0.4 mm. In other embodiments, the polymer layer 78 has a thickness of 0.08 mm to 0.4 mm. In other embodiments, the polymer layer 78 has a thickness of 0.09 mm to 0.4 mm. In other embodiments, the polymer layer 78 has a thickness of 0.1 mm to 0.4 mm. In other embodiments, the polymer layer 78 has a thickness of 0.15 mm to 0.4 mm. In other embodiments, the polymer layer 78 has a thickness of 0.2 mm to 0.4 mm. In other embodiments, the polymer layer 78 has a thickness of 0.25 mm to 0.4 mm. In other embodiments, the polymer layer 78 has a thickness of 0.3 mm to 0.4 mm. In other embodiments, the polymer layer 78 has a thickness of 0.35 mm to 0.4 mm.

In other embodiments, the polymer layer 78 has a thickness of 0.025 mm to 0.1 mm. In other embodiments, the polymer layer 78 has a thickness of 0.03 mm to 0.1 mm. In other embodiments, the polymer layer 78 has a thickness of 0.035 mm to 0.1 mm. In other embodiments, the polymer layer 78 has a thickness of 0.04 mm to 0.1 mm. In other embodiments, the polymer layer 78 has a thickness of 0.045 mm to 0.1 mm. In other embodiments, the polymer layer 78 has a thickness of 0.05 mm to 0.1 mm. In other embodiments, the polymer layer 78 has a thickness of 0.06 mm to 0.1 mm. In other embodiments, the polymer layer 78 has a thickness of 0.065 mm to 0.1 mm. In other embodiments, the polymer layer 78 has a thickness of 0.07 mm to 0.1 mm. In other embodiments, the polymer layer 78 has a thickness of 0.075 mm to 0.1 mm. In other embodiments, the polymer layer 78 has a thickness of 0.08 mm to 0.1 mm. In other embodiments, the polymer layer 78 has a thickness of 0.085 mm to 0.1 mm. In other embodiments, the polymer layer 78 has a thickness of 0.09 mm to 0.1 mm. In other embodiments, the polymer layer 78 has a thickness of 0.095 mm to 0.1 mm.

In some embodiments, the adhesive layer 80 has a thickness of 1 μm to 900 μm. In some embodiments, the adhesive layer 80 has a thickness of 1 μm to 900 μm. In some embodiments, the adhesive layer 80 has a thickness of 1 μm to 850 μm. In some embodiments, the adhesive layer 80 has a thickness of 1 μm to 800 μm. In some embodiments, the adhesive layer 80 has a thickness of 1 μm to 750 μm. In some embodiments, the adhesive layer 80 has a thickness of 1 μm to 700 μm. In some embodiments, the adhesive layer 80 has a thickness of 1 μm to 650 μm. In some embodiments, the adhesive layer 80 has a thickness of 1 μm to 600 μm. In some embodiments, the adhesive layer 80 has a thickness of 1 μm to 550 μm. In some embodiments, the adhesive layer 80 has a thickness of 1 μm to 500 μm. In some embodiments, the adhesive layer 80 has a thickness of 1 μm to 450 μm. In some embodiments, the adhesive layer 80 has a thickness of 1 μm to 400 μm. In some embodiments, the adhesive layer 80 has a thickness of 1 μm to 350 μm. In some embodiments, the adhesive layer 80 has a thickness of 1 μm to 300 μm. In some embodiments, the adhesive layer 80 has a thickness of 1 μm to 250 μm. In some embodiments, the adhesive layer 80 has a thickness of 1 μm to 200 μm. In some embodiments, the adhesive layer 80 has a thickness of 1 μm to 150 μm. In some embodiments, the adhesive layer 80 has a thickness of 1 μm to 100 μm. In some embodiments, the adhesive layer 80 has a thickness of 1 μm to 50 μm.

In some embodiments, the adhesive layer 80 has a thickness of 50 μm to 900 μm. In some embodiments, the adhesive layer 80 has a thickness of 50 μm to 850 μm. In some embodiments, the adhesive layer 80 has a thickness of 50 μm to 800 μm. In some embodiments, the adhesive layer 80 has a thickness of 50 μm to 750 μm. In some embodiments, the adhesive layer 80 has a thickness of 50 μm to 700 μm. In some embodiments, the adhesive layer 80 has a thickness of 50 μm to 650 μm. In some embodiments, the adhesive layer 80 has a thickness of 50 μm to 600 μm. In some embodiments, the adhesive layer 80 has a thickness of 50 μm to 550 μm. In some embodiments, the adhesive layer 80 has a thickness of 50 μm to 500 μm. In some embodiments, the adhesive layer 80 has a thickness of 50 μm to 450 μm. In some embodiments, the adhesive layer 80 has a thickness of 50 μm to 400 μm. In some embodiments, the adhesive layer 80 has a thickness of 50 μm to 350 μm. In some embodiments, the adhesive layer 80 has a thickness of 50 μm to 300 μm. In some embodiments, the adhesive layer 80 has a thickness of 50 μm to 250 μm. In some embodiments, the adhesive layer 80 has a thickness of 50 μm to 200 μm. In some embodiments, the adhesive layer 80 has a thickness of 50 μm to 150 μm. In some embodiments, the adhesive layer 80 has a thickness of 50 μm to 100 μm.

In some embodiments, the adhesive layer 80 has a thickness of 100 μm to 900 μm. In some embodiments, the adhesive layer 80 has a thickness of 100 μm to 850 μm. In some embodiments, the adhesive layer 80 has a thickness of 100 μm to 800 μm. In some embodiments, the adhesive layer 80 has a thickness of 100 μm to 750 μm. In some embodiments, the adhesive layer 80 has a thickness of 100 μm to 700 μm. In some embodiments, the adhesive layer 80 has a thickness of 100 μm to 650 μm. In some embodiments, the adhesive layer 80 has a thickness of 100 μm to 600 μm. In some embodiments, the adhesive layer 80 has a thickness of 100 μm to 550 μm. In some embodiments, the adhesive layer 80 has a thickness of 100 μm to 500 μm. In some embodiments, the adhesive layer 80 has a thickness of 100 μm to 450 μm. In some embodiments, the adhesive layer 80 has a thickness of 100 μm to 400 μm. In some embodiments, the adhesive layer 80 has a thickness of 100 μm to 350 μm. In some embodiments, the adhesive layer 80 has a thickness of 100 μm to 300 μm. In some embodiments, the adhesive layer 80 has a thickness of 100 μm to 250 μm. In some embodiments, the adhesive layer 80 has a thickness of 100 μm to 200 μm. In some embodiments, the adhesive layer 80 has a thickness of 100 μm to 150 μm.

In some embodiments, the adhesive layer 80 has a thickness of 150 μm to 900 μm. In some embodiments, the adhesive layer 80 has a thickness of 150 μm to 850 μm. In some embodiments, the adhesive layer 80 has a thickness of 150 μm to 800 μm. In some embodiments, the adhesive layer 80 has a thickness of 150 μm to 750 μm. In some embodiments, the adhesive layer 80 has a thickness of 150 μm to 700 μm. In some embodiments, the adhesive layer 80 has a thickness of 150 μm to 650 μm. In some embodiments, the adhesive layer 80 has a thickness of 150 μm to 600 μm. In some embodiments, the adhesive layer 80 has a thickness of 150 μm to 550 μm. In some embodiments, the adhesive layer 80 has a thickness of 150 μm to 500 μm. In some embodiments, the adhesive layer 80 has a thickness of 150 μm to 450 μm. In some embodiments, the adhesive layer 80 has a thickness of 150 μm to 400 μm. In some embodiments, the adhesive layer 80 has a thickness of 150 μm to 350 μm. In some embodiments, the adhesive layer 80 has a thickness of 150 μm to 300 μm. In some embodiments, the adhesive layer 80 has a thickness of 150 μm to 250 μm. In some embodiments, the adhesive layer 80 has a thickness of 150 μm to 200 μm.

In some embodiments, the adhesive layer 80 has a thickness of 200 μm to 900 μm. In some embodiments, the adhesive layer 80 has a thickness of 200 μm to 850 μm. In some embodiments, the adhesive layer 80 has a thickness of 200 μm to 800 μm. In some embodiments, the adhesive layer 80 has a thickness of 200 μm to 750 μm. In some embodiments, the adhesive layer 80 has a thickness of 200 μm to 700 μm. In some embodiments, the adhesive layer 80 has a thickness of 200 μm to 650 μm. In some embodiments, the adhesive layer 80 has a thickness of 200 μm to 600 μm. In some embodiments, the adhesive layer 80 has a thickness of 200 μm to 550 μm. In some embodiments, the adhesive layer 80 has a thickness of 200 μm to 500 μm. In some embodiments, the adhesive layer 80 has a thickness of 200 μm to 450 μm. In some embodiments, the adhesive layer 80 has a thickness of 200 μm to 400 μm. In some embodiments, the adhesive layer 80 has a thickness of 200 μm to 350 μm. In some embodiments, the adhesive layer 80 has a thickness of 200 μm to 300 μm. In some embodiments, the adhesive layer 80 has a thickness of 200 μm to 250 μm.

In some embodiments, the adhesive layer 80 has a thickness of 250 μm to 900 μm. In some embodiments, the adhesive layer 80 has a thickness of 250 μm to 850 μm. In some embodiments, the adhesive layer 80 has a thickness of 250 μm to 800 μm. In some embodiments, the adhesive layer 80 has a thickness of 250 μm to 750 μm. In some embodiments, the adhesive layer 80 has a thickness of 250 μm to 700 μm. In some embodiments, the adhesive layer 80 has a thickness of 250 μm to 650 μm. In some embodiments, the adhesive layer 80 has a thickness of 250 μm to 600 μm. In some embodiments, the adhesive layer 80 has a thickness of 250 μm to 550 μm. In some embodiments, the adhesive layer 80 has a thickness of 250 μm to 500 μm. In some embodiments, the adhesive layer 80 has a thickness of 250 μm to 450 μm. In some embodiments, the adhesive layer 80 has a thickness of 250 μm to 400 μm. In some embodiments, the adhesive layer 80 has a thickness of 250 μm to 350 μm. In some embodiments, the adhesive layer 80 has a thickness of 250 μm to 300 μm.

In some embodiments, the adhesive layer 80 has a thickness of 300 μm to 900 μm. In some embodiments, the adhesive layer 80 has a thickness of 300 µm to 850 µm. In some embodiments, the adhesive layer 80 has a thickness of 300 µm to 800 µm. In some embodiments, the adhesive layer 80 has a thickness of 300 µm to 750 µm. In some embodiments, the adhesive layer 80 has a thickness of 300 µm to 700 µm. In some embodiments, the adhesive layer 80 has a thickness of 300 µm to 650 µm. In some embodiments, the adhesive layer 80 has a thickness of 300 µm to 600 µm. In some embodiments, the adhesive layer 80 has a thickness of 300 µm to 550 µm. In some embodiments, the adhesive layer 80 has a thickness of 300 µm to 500 µm. In some embodiments, the adhesive layer 80 has a thickness of 300 µm to 450 µm. In some embodiments, the adhesive layer 80 has a thickness of 300 µm to 400 µm. In some embodiments, the adhesive layer 80 has a thickness of 300 µm to 350 µm.

In some embodiments, the adhesive layer 80 has a thickness of 350 µm to 900 µm. In some embodiments, the adhesive layer 80 has a thickness of 350 µm to 850 µm. In some embodiments, the adhesive layer 80 has a thickness of 350 µm to 800 µm. In some embodiments, the adhesive layer 80 has a thickness of 350 µm to 750 µm. In some embodiments, the adhesive layer 80 has a thickness of 350 µm to 700 µm. In some embodiments, the adhesive layer 80 has a thickness of 350 µm to 650 µm. In some embodiments, the adhesive layer 80 has a thickness of 350 µm to 600 µm. In some embodiments, the adhesive layer 80 has a thickness of 350 µm to 550 µm. In some embodiments, the adhesive layer 80 has a thickness of 350 µm to 500 µm. In some embodiments, the adhesive layer 80 has a thickness of 350 µm to 450 µm. In some embodiments, the adhesive layer 80 has a thickness of 350 µm to 400 µm.

In some embodiments, the adhesive layer 80 has a thickness of 400 µm to 900 µm. In some embodiments, the adhesive layer 80 has a thickness of 400 µm to 850 µm. In some embodiments, the adhesive layer 80 has a thickness of 400 µm to 800 µm. In some embodiments, the adhesive layer 80 has a thickness of 400 µm to 750 µm. In some embodiments, the adhesive layer 80 has a thickness of 400 µm to 700 µm. In some embodiments, the adhesive layer 80 has a thickness of 400 µm to 650 µm. In some embodiments, the adhesive layer 80 has a thickness of 400 µm to 600 µm. In some embodiments, the adhesive layer 80 has a thickness of 400 µm to 550 µm. In some embodiments, the adhesive layer 80 has a thickness of 400 µm to 500 µm. In some embodiments, the adhesive layer 80 has a thickness of 400 µm to 450 µm.

In some embodiments, the adhesive layer 80 has a thickness of 450 µm to 900 µm. In some embodiments, the adhesive layer 80 has a thickness of 450 µm to 850 µm. In some embodiments, the adhesive layer 80 has a thickness of 450 µm to 800 µm. In some embodiments, the adhesive layer 80 has a thickness of 450 µm to 750 µm. In some embodiments, the adhesive layer 80 has a thickness of 450 µm to 700 µm. In some embodiments, the adhesive layer 80 has a thickness of 450 µm to 650 µm. In some embodiments, the adhesive layer 80 has a thickness of 450 µm to 600 µm. In some embodiments, the adhesive layer 80 has a thickness of 450 µm to 550 µm. In some embodiments, the adhesive layer 80 has a thickness of 450 µm to 500 µm.

In some embodiments, the adhesive layer 80 has a thickness of 500 µm to 900 µm. In some embodiments, the adhesive layer 80 has a thickness of 500 µm to 850 µm. In some embodiments, the adhesive layer 80 has a thickness of 500 µm to 800 µm. In some embodiments, the adhesive layer 80 has a thickness of 500 µm to 750 µm. In some embodiments, the adhesive layer 80 has a thickness of 500 µm to 700 µm. In some embodiments, the adhesive layer 80 has a thickness of 500 µm to 650 µm. In some embodiments, the adhesive layer 80 has a thickness of 500 µm to 600 µm. In some embodiments, the adhesive layer 80 has a thickness of 500 µm to 550 µm.

In some embodiments, the adhesive layer 80 has a thickness of 550 µm to 900 µm. In some embodiments, the adhesive layer 80 has a thickness of 550 µm to 850 µm. In some embodiments, the adhesive layer 80 has a thickness of 550 µm to 800 µm. In some embodiments, the adhesive layer 80 has a thickness of 550 µm to 750 µm. In some embodiments, the adhesive layer 80 has a thickness of 550 µm to 700 µm. In some embodiments, the adhesive layer 80 has a thickness of 550 µm to 650 µm. In some embodiments, the adhesive layer 80 has a thickness of 550 µm to 600 µm.

In some embodiments, the adhesive layer 80 has a thickness of 600 µm to 900 µm. In some embodiments, the adhesive layer 80 has a thickness of 600 µm to 850 µm. In some embodiments, the adhesive layer 80 has a thickness of 600 µm to 800 µm. In some embodiments, the adhesive layer 80 has a thickness of 600 µm to 750 µm. In some embodiments, the adhesive layer 80 has a thickness of 600 µm to 700 µm. In some embodiments, the adhesive layer 80 has a thickness of 600 µm to 650 µm.

In some embodiments, the adhesive layer 80 has a thickness of 650 µm to 900 µm. In some embodiments, the adhesive layer 80 has a thickness of 650 µm to 850 µm. In some embodiments, the adhesive layer 80 has a thickness of 650 µm to 800 µm. In some embodiments, the adhesive layer 80 has a thickness of 650 µm to 750 µm. In some embodiments, the adhesive layer 80 has a thickness of 650 µm to 700 µm. In some embodiments, the adhesive layer 80 has a thickness of 700 µm to 900 µm. In some embodiments, the adhesive layer 80 has a thickness of 700 µm to 850 µm. In some embodiments, the adhesive layer 80 has a thickness of 700 µm to 800 µm. In some embodiments, the adhesive layer 80 has a thickness of 700 µm to 750 µm. In some embodiments, the adhesive layer 80 has a thickness of 750 µm to 900 µm. In some embodiments, the adhesive layer 80 has a thickness of 750 µm to 850 µm. In some embodiments, the adhesive layer 80 has a thickness of 750 µm to 800 µm. In some embodiments, the adhesive layer 80 has a thickness of 800 µm to 900 µm. In some embodiments, the adhesive layer 80 has a thickness of 800 µm to 850 µm. In some embodiments, the adhesive layer 80 has a thickness of 850 µm to 900 µm.

In some embodiments, the adhesive layer 80 has a thickness of 1 µm. In some embodiments, the adhesive layer 80 has a thickness of 50 µm. In some embodiments, the adhesive layer 80 has a thickness of 100 µm. In some embodiments, the adhesive layer 80 has a thickness of 1 µm. In some embodiments, the adhesive layer 80 has a thickness of 150 µm. In some embodiments, the adhesive layer 80 has a thickness of 200 µm. In some embodiments, the adhesive layer 80 has a thickness of 250 µm. In some embodiments, the adhesive layer 80 has a thickness of 300 µm. In some embodiments, the adhesive layer 80 has a thickness of 350 µm. In some embodiments, the adhesive layer 80 has a thickness of 400 µm. In some embodiments, the adhesive layer 80 has a thickness of 450 µm. In some embodiments, the adhesive layer 80 has a thickness of 500 µm. In some embodiments, the adhesive layer 80 has a thickness of 550 µm. In some embodiments, the adhesive layer 80 has a thickness of 600 µm. In some embodiments, the adhesive layer 80 has a thickness of 650 µm. In some embodiments, the adhesive layer 80 has a thickness of 700 µm. In some embodiments, the adhesive layer 80 has a thickness of 750 µm. In some embodiments, the adhesive layer 80 has a thickness of 800 µm. In some embodiments, the adhesive layer 80 has a thickness of 850 µm. In some embodiments, the adhesive layer 80 has a thickness of 900 µm.

In some embodiments, the jumper module 10 has a thickness of 1 mm to 10 mm. In some embodiments, the jumper module 10 has a thickness of 1 mm to 9 mm. In some embodiments, the jumper module 10 has a thickness of 1 mm to 8 mm. In some embodiments, the jumper module 10 has a thickness of 1 mm to 7 mm. In some embodiments, the jumper module 10 has a thickness of 1 mm to 6 mm. In some embodiments, the jumper module 10 has a thickness of 1 mm to 5 mm. In some embodiments, the jumper module 10 has a thickness of 1 mm to 4 mm. In some embodiments, the jumper module 10 has a thickness of 1 mm to 3 mm. In some embodiments, the jumper module 10 has a thickness of 1 mm to 2 mm.

In some embodiments, the jumper module 10 has a thickness of 2 mm to 10 mm. In some embodiments, the jumper module 10 has a thickness of 2 mm to 9 mm. In some embodiments, the jumper module 10 has a thickness of 2 mm to 8 mm. In some embodiments, the jumper module 10 has a thickness of 2 mm to 7 mm. In some embodiments, the jumper module 10 has a thickness of 2 mm to 6 mm. In some embodiments, the jumper module 10 has a thickness of 2 mm to 5 mm. In some embodiments, the jumper module 10 has a thickness of 2 mm to 4 mm. In some embodiments, the jumper module 10 has a thickness of 2 mm to 3 mm.

In some embodiments, the jumper module 10 has a thickness of 3 mm to 10 mm. In some embodiments, the jumper module 10 has a thickness of 3 mm to 9 mm. In some embodiments, the jumper module 10 has a thickness of 3 mm to 8 mm. In some embodiments, the jumper module 10 has a thickness of 3 mm to 7 mm. In some embodiments, the jumper module 10 has a thickness of 3 mm to 6 mm. In some embodiments, the jumper module 10 has a thickness of 3 mm to 5 mm. In some embodiments, the jumper module 10 has a thickness of 3 mm to 4 mm.

In some embodiments, the jumper module 10 has a thickness of 4 mm to 10 mm. In some embodiments, the jumper module 10 has a thickness of 4 mm to 9 mm. In some embodiments, the jumper module 10 has a thickness of 4 mm to 8 mm. In some embodiments, the jumper module 10 has a thickness of 4 mm to 7 mm. In some embodiments, the jumper module 10 has a thickness of 4 mm to 6 mm. In some embodiments, the jumper module 10 has a thickness of 4 mm to 5 mm. In some embodiments, the jumper module 10 has a thickness of 5 mm to 10 mm. In some embodiments, the jumper module 10 has a thickness of 5 mm to 9 mm. In some embodiments, the jumper module 10 has a thickness of 5 mm to 8 mm. In some embodiments, the jumper module 10 has a thickness of 5 mm to 7 mm. In some embodiments, the jumper module 10 has a thickness of 5 mm to 6 mm.

In some embodiments, the jumper module 10 has a thickness of 6 mm to 10 mm. In some embodiments, the jumper module 10 has a thickness of 6 mm to 9 mm. In some embodiments, the jumper module 10 has a thickness of 6 mm to 8 mm. In some embodiments, the jumper module 10 has a thickness of 6 mm to 7 mm. In some embodiments, the jumper module 10 has a thickness of 7 mm to 10 mm. In some embodiments, the jumper module 10 has a thickness of 7 mm to 9 mm. In some embodiments, the jumper module 10 has a thickness of 7 mm to 8 mm. In some embodiments, the jumper module 10 has a thickness of 8 mm to 10 mm. In some embodiments, the jumper module 10 has a thickness of 8 mm to 9 mm. In some embodiments, the jumper module 10 has a thickness of 9 mm to 10 mm.

Figure 7:
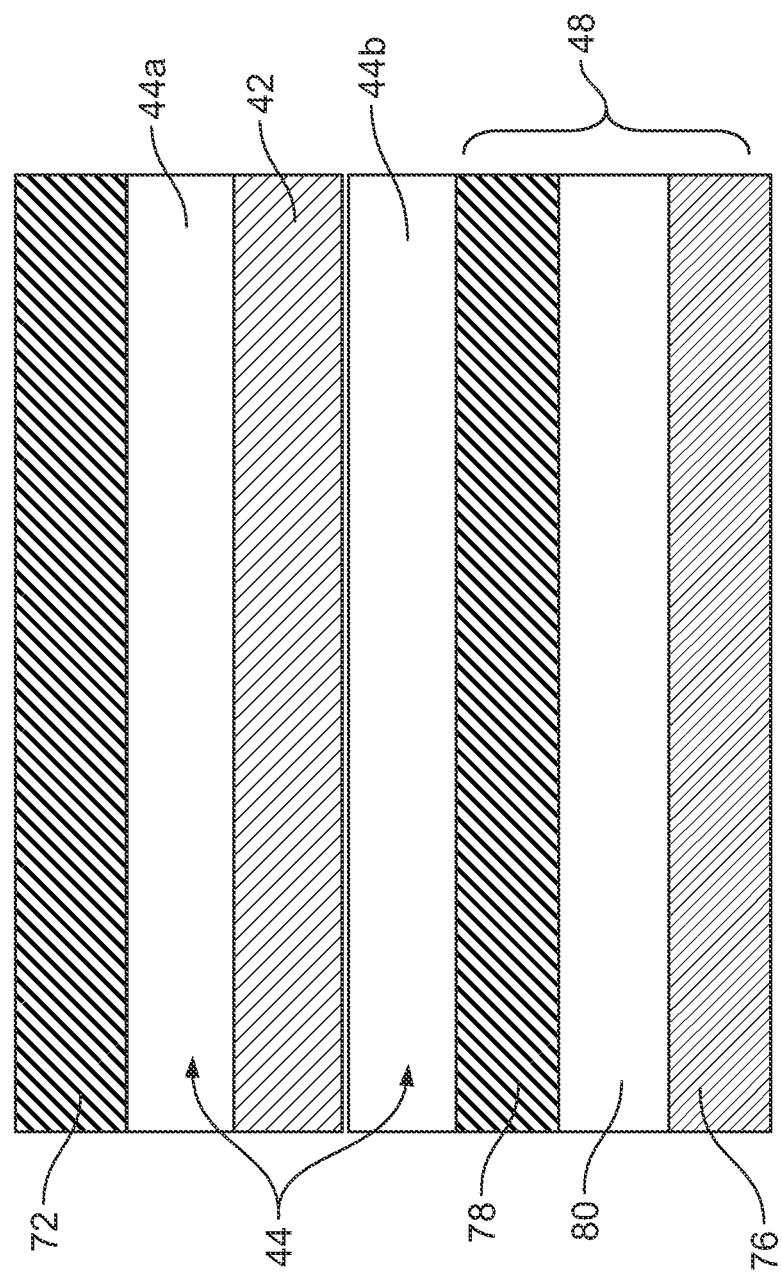
FIG. 7 is a schematic view of a side lap of the jumper module shown in FIG. 1.

FIG. 7 shows a schematic view of the first side lap 30 and the second side lap 32. In some embodiments, the first side lap 30 includes the same structure and materials as the active portion 12, except the first side lap 30 does not include the upper layer 70 and the adhesive layer 74. In some embodiments, the polymer layer 72 is an upper, sun facing-side surface of the first side lap 30. In some embodiments, the second side lap 32 includes the same structure and materials as the active portion 12, except the second side lap 32 does not include the upper layer 70 and the adhesive layer 74. In some embodiments, the polymer layer 72 is an upper, sun facing-side surface of the second side lap 32.

In some embodiments, the jumper module 10 is moisture resistant. As used herein, the term "moisture resistant" means having a water transmission rate of less than or equal to 0.05 U.S. perms, as measured by ASTM E 96, Procedure B—Standard Test Methods for Water Vapor Transmission of Materials. In some embodiments, the jumper module 10 withstands walking loads/step resistance that conforms to standards under UL 3741 test standards (UL Standard for Safety Photovoltaic Hazard Control). In some embodiments, the jumper module 10 includes an axe impact resistance that conforms to standards under UL 3741 test standards. In some embodiments, the jumper module 10 includes a body fall resistance that conforms to standards under UL 3741 test standards.

Figure 8:
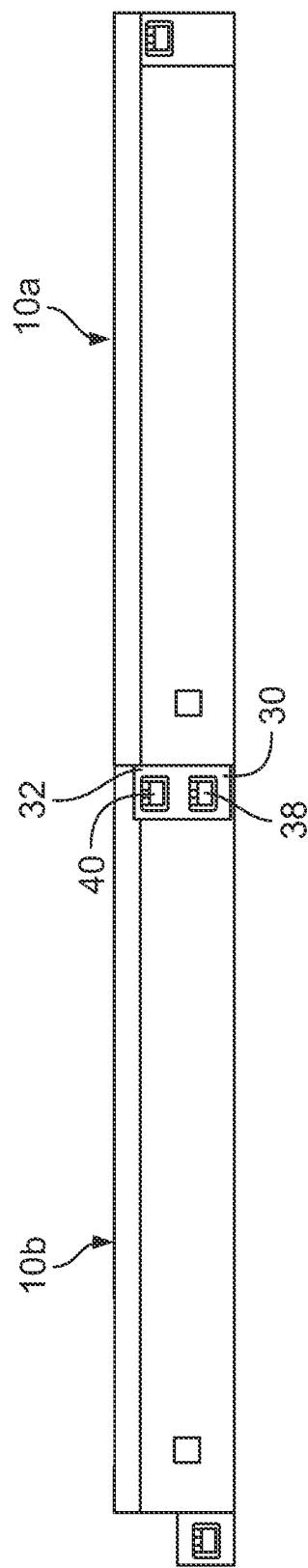
FIG. 8 is a top plan view of a jumper module shown in FIG. 2 overlaying another one of the jumper module.

Referring to FIG. 8, in some embodiments, one of the jumper module 10a is configured to overlay another one of the jumper module 10b. In some embodiments, the first side lap 30 of the jumper module 10a overlays the second side lap 32 of the jumper module 10b. In some embodiments, the first side lap 30 of the jumper module 10a is attached to the second side lap 32 of the jumper module 10b. In some embodiments, the first side lap 30 of the jumper module 10a is attached to the second side lap 32 of the jumper module 10b by an adhesive. In some embodiments, the first side lap 30 of the jumper module 10a is attached to the second side lap 32 of the jumper module 10b by thermal bonding. In some embodiments, the first side lap 30 of the jumper module 10a is attached to the second side lap 32 of the jumper module 10b by ultrasonic welding. In some embodiments, the first side lap 30 of the jumper module 10a is attached to the second side lap 32 of the jumper module 10b by at least one fastener. In some embodiments, the first junction box 38 of the jumper module 10a is positioned proximate to the second junction box 40 of the jumper module 10b. In some embodiments, the first junction box 38 and the second junction box 40 are arranged in a linear array.

Figure 9:
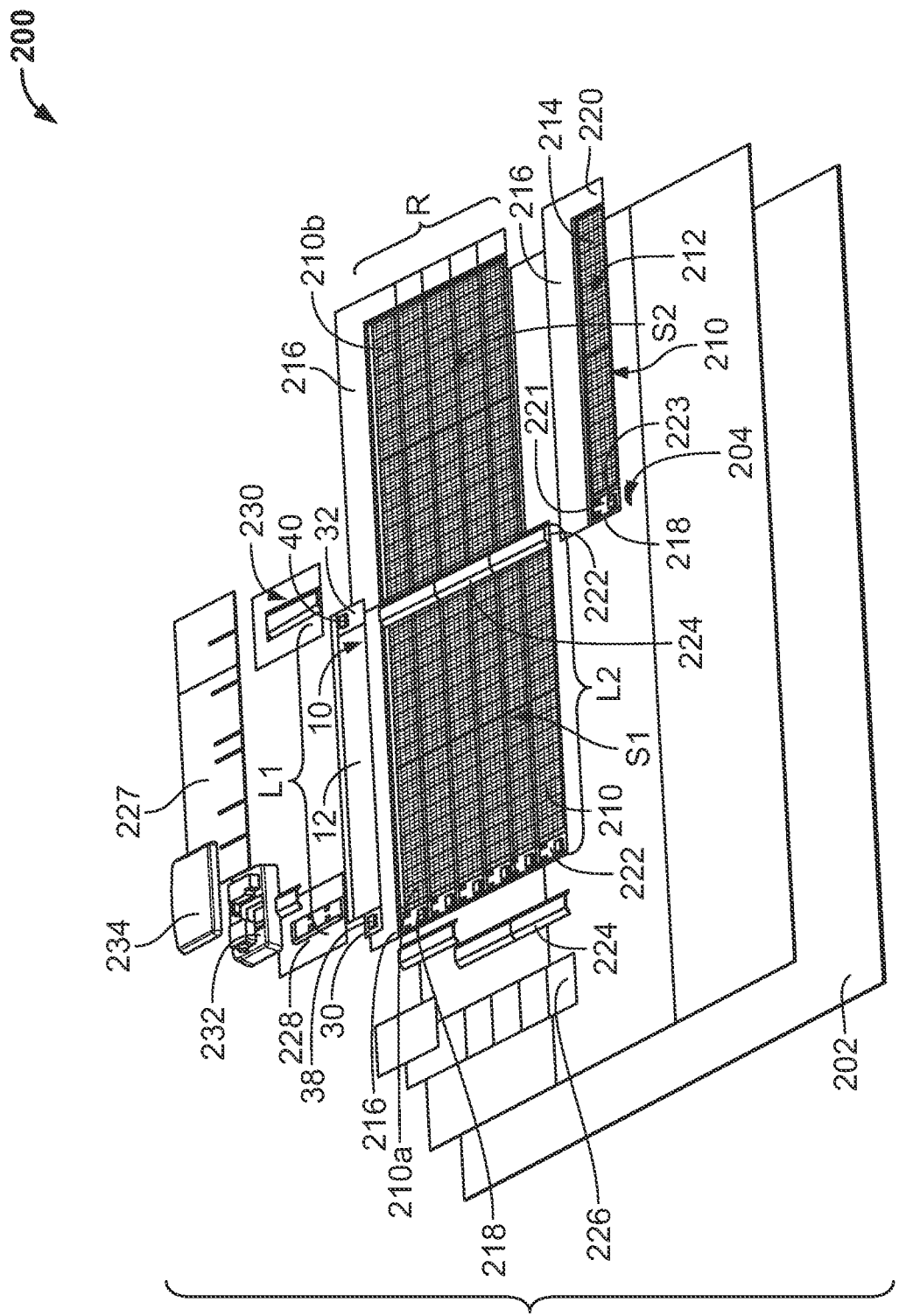
FIG. 9 is an exploded, top perspective view of a photovoltaic system employing the jumper module shown in FIGS. 1 through 6.

Referring to FIG. 9, in some embodiments, the jumper module 10 is configured to be a component of a photovoltaic system 200 installed on a roof deck 202. In some embodiments, the roof deck 202 is steep slope roof deck. As defined herein, a "steep slope roof deck" is any roof deck that is disposed on a roof having a pitch of Y/X, where Y and X are in a ratio of 4:12 to 12:12, where Y corresponds to the "rise" of the roof, and where X corresponds to the "run" of the roof.

In some embodiments, the photovoltaic system 200 includes an underlayment layer 204 installed on the roof deck 202. In some embodiments, the photovoltaic system 200 includes a plurality of photovoltaic modules 210. In some embodiments, the plurality of photovoltaic modules 210 overlay the underlayment layer 204. In some embodiments, the photovoltaic modules 210 are arranged in an array on the roof deck 202. In some embodiments, the array of the photovoltaic modules 210 includes subarrays S1, S2. In certain embodiments, the array includes more than the two subarrays S1, S2. In some embodiments, the array includes a single array. In some embodiments, each of the subarrays S1, S2 include a plurality of rows R of the photovoltaic modules 210.

In some embodiments, each of the photovoltaic modules 210 includes a reveal portion 212 having a plurality of solar cells 214, a head lap portion 216, and first and second side laps 218, 220. In some embodiments, the first side lap 218 of one of the photovoltaic modules 210 in the subarray S2 overlays the second side lap 220 of an adjacent another one of the photovoltaic modules 210 in the subarray S1 in the same one of the rows R. In some embodiments, the overlaying first side lap 218 includes a wire cover bracket 221. In some embodiments, the reveal portion 212 of one of the photovoltaic modules 210 in a subarray S1 overlays the head lap portion 216 of an adjacent another one of the photovoltaic modules 210 of the subarray S1. In some embodiments, the overlay of the first and second side laps 218, 220 form at least one wireway 222. In some embodiments, the at least one wireway 222 includes a plurality of wireways. In some embodiments, the at least one wireway 222 includes a plurality of the wire cover brackets 221. In some embodiments, the wire cover brackets 221 are aligned in a column. In some embodiments, each of the wire cover brackets 221 is configured to receive at least one electrical component. In some embodiments, the electrical component is a junction box 223. In some embodiments, the electrical component is an electrical connector. In some embodiments, at least one wireway cover 224 is attached to at least a corresponding one of the wire cover brackets 221. In some embodiments, the at least one wireway cover 224 is removably attached to at least a corresponding one of the wire cover brackets 221. In some embodiments, one of the wireway covers 224 is attached to a plurality of the wire cover brackets 221. In some embodiments, the at least one wireway cover 224 includes a plurality of wireway covers 224. In some embodiments, each of the plurality of wireway covers 224 is configured to removably interlock with one another.

In some embodiments, one of the jumper modules 10 overlays an uppermost one of the photovoltaic modules 210a in a column of the subarray S1. In some embodiments, the active portion 12 of the jumper module 10 overlays the head lap portion 216 of the photovoltaic module 210a. In some embodiments, the active portion 12 of the jumper module 10 overlays a portion of the head lap portion 216 of the photovoltaic module 210a. In some embodiments, the active portion 12 of the jumper module 10 overlays the entirety of the head lap portion 216 of the photovoltaic module 210a. In some embodiments, the first side lap 30 of the jumper module 10 aligns with the first side lap 218 of the photovoltaic module 210a.

In some embodiments, the jumper module 10 has a length L1. In some embodiments, each of the photovoltaic modules 210 has a length L2. In some embodiments, the length L1 is equal to L2. In some embodiments, the length L1 is approximately equal to L2.

In some embodiments, the length L1 is 30 inches to 80 inches. In some embodiments, the length L1 is 30 inches to 75 inches. In some embodiments, the length L1 is 30 inches to 70 inches. In some embodiments, the length L1 is 30 inches to 65 inches. In some embodiments, the length L1 is 30 inches to 60 inches. In some embodiments, the length L1 is 30 inches to 55 inches. In some embodiments, the length L1 is 30 inches to 50 inches. In some embodiments, the length L1 is 30 inches to 45 inches. In some embodiments, the length L1 is 30 inches to 40 inches. In some embodiments, the length L1 is 30 inches to 35 inches.

In some embodiments, the length L1 is 35 inches to 80 inches. In some embodiments, the length L1 is 35 inches to 75 inches. In some embodiments, the length L1 is 35 inches to 70 inches. In some embodiments, the length L1 is 35 inches to 65 inches. In some embodiments, the length L1 is 35 inches to 60 inches. In some embodiments, the length L1 is 35 inches to 55 inches. In some embodiments, the length L1 is 35 inches to 50 inches. In some embodiments, the length L1 is 35 inches to 45 inches. In some embodiments, the length L1 is 35 inches to 40 inches. In some embodiments, the length L1 is 40 inches to 80 inches. In some embodiments, the length L1 is 40 inches to 75 inches. In some embodiments, the length L1 is 40 inches to 70 inches. In some embodiments, the length L1 is 40 inches to 65 inches. In some embodiments, the length L1 is 40 inches to 60 inches. In some embodiments, the length L1 is 40 inches to 55 inches. In some embodiments, the length L1 is 40 inches to 50 inches. In some embodiments, the length L1 is 40 inches to 45 inches.

In some embodiments, the length L1 is 45 inches to 80 inches. In some embodiments, the length L1 is 45 inches to 75 inches. In some embodiments, the length L1 is 45 inches to 70 inches. In some embodiments, the length L1 is 45 inches to 65 inches. In some embodiments, the length L1 is 45 inches to 60 inches. In some embodiments, the length L1 is 45 inches to 55 inches. In some embodiments, the length L1 is 45 inches to 50 inches. In some embodiments, the length L1 is 50 inches to 80 inches. In some embodiments, the length L1 is 50 inches to 75 inches. In some embodiments, the length L1 is 50 inches to 70 inches. In some embodiments, the length L1 is 50 inches to 65 inches. In some embodiments, the length L1 is 50 inches to 60 inches. In some embodiments, the length L1 is 50 inches to 55 inches.

In some embodiments, the length L1 is 55 inches to 80 inches. In some embodiments, the length L1 is 55 inches to 75 inches. In some embodiments, the length L1 is 55 inches to 70 inches. In some embodiments, the length L1 is 55 inches to 65 inches. In some embodiments, the length L1 is 55 inches to 60 inches. In some embodiments, the length L1 is 60 inches to 80 inches. In some embodiments, the length L1 is 60 inches to 75 inches. In some embodiments, the length L1 is 60 inches to 70 inches. In some embodiments, the length L1 is 60 inches to 65 inches. In some embodiments, the length L1 is 65 inches to 80 inches. In some embodiments, the length L1 is 65 inches to 75 inches. In some embodiments, the length L1 is 65 inches to 70 inches. In some embodiments, the length L1 is 70 inches to 80 inches. In some embodiments, the length L1 is 70 inches to 75 inches. In some embodiments, the length L1 is 75 inches to 80 inches.

In some embodiments, the length L1 is 30 inches. In some embodiments, the length L1 is 35 inches. In some embodiments, the length L1 is 40 inches. In some embodiments, the length L1 is 45 inches. In some embodiments, the length L1 is 50 inches. In some embodiments, the length L1 is 55 inches. In some embodiments, the length L1 is 60 inches. In some embodiments, the length L1 is 65 inches. In some embodiments, the length L1 is 70 inches. In some embodiments, the length L1 is 75 inches. In some embodiments, the length L1 is 80 inches.

In some embodiments, the length L2 is 30 inches to 80 inches. In some embodiments, the length L2 is 30 inches to 75 inches. In some embodiments, the length L2 is 30 inches to 70 inches. In some embodiments, the length L2 is 30 inches to 65 inches. In some embodiments, the length L2 is 30 inches to 60 inches. In some embodiments, the length L2 is 30 inches to 55 inches. In some embodiments, the length L2 is 30 inches to 50 inches. In some embodiments, the length L2 is 30 inches to 45 inches. In some embodiments, the length L2 is 30 inches to 40 inches. In some embodiments, the length L2 is 30 inches to 35 inches.

In some embodiments, the length L2 is 35 inches to 80 inches. In some embodiments, the length L2 is 35 inches to 75 inches. In some embodiments, the length L2 is 35 inches to 70 inches. In some embodiments, the length L2 is 35 inches to 65 inches. In some embodiments, the length L2 is 35 inches to 60 inches. In some embodiments, the length L2 is 35 inches to 55 inches. In some embodiments, the length L2 is 35 inches to 50 inches. In some embodiments, the length L2 is 35 inches to 45 inches. In some embodiments, the length L2 is 35 inches to 40 inches. In some embodiments, the length L2 is 40 inches to 80 inches. In some embodiments, the length L2 is 40 inches to 75 inches. In some embodiments, the length L2 is 40 inches to 70 inches. In some embodiments, the length L2 is 40 inches to 65 inches. In some embodiments, the length L2 is 40 inches to 60 inches. In some embodiments, the length L2 is 40 inches to 55 inches. In some embodiments, the length L2 is 40 inches to 50 inches. In some embodiments, the length L2 is 40 inches to 45 inches.

In some embodiments, the length L2 is 45 inches to 80 inches. In some embodiments, the length L2 is 45 inches to 75 inches. In some embodiments, the length L2 is 45 inches to 70 inches. In some embodiments, the length L2 is 45 inches to 65 inches. In some embodiments, the length L2 is 45 inches to 60 inches. In some embodiments, the length L2 is 45 inches to 55 inches. In some embodiments, the length L2 is 45 inches to 50 inches. In some embodiments, the length L2 is 50 inches to 80 inches. In some embodiments, the length L2 is 50 inches to 75 inches. In some embodiments, the length L2 is 50 inches to 70 inches. In some embodiments, the length L2 is 50 inches to 65 inches. In some embodiments, the length L2 is 50 inches to 60 inches. In some embodiments, the length L2 is 50 inches to 55 inches.

In some embodiments, the length L2 is 55 inches to 80 inches. In some embodiments, the length L2 is 55 inches to 75 inches. In some embodiments, the length L2 is 55 inches to 70 inches. In some embodiments, the length L2 is 55 inches to 65 inches. In some embodiments, the length L2 is 55 inches to 60 inches. In some embodiments, the length L2 is 60 inches to 80 inches. In some embodiments, the length L2 is 60 inches to 75 inches. In some embodiments, the length L2 is 60 inches to 70 inches. In some embodiments, the length L2 is 60 inches to 65 inches. In some embodiments, the length L2 is 65 inches to 80 inches. In some embodiments, the length L2 is 65 inches to 75 inches. In some embodiments, the length L2 is 65 inches to 70 inches. In some embodiments, the length L2 is 70 inches to 80 inches. In some embodiments, the length L2 is 70 inches to 75 inches. In some embodiments, the length L2 is 75 inches to 80 inches.

In some embodiments, the length L2 is 30 inches. In some embodiments, the length L2 is 35 inches. In some embodiments, the length L2 is 40 inches. In some embodiments, the length L2 is 45 inches. In some embodiments, the length L2 is 50 inches. In some embodiments, the length L2 is 55 inches. In some embodiments, the length L2 is 60 inches. In some embodiments, the length L2 is 65 inches. In some embodiments, the length L2 is 70 inches. In some embodiments, the length L2 is 75 inches. In some embodiments, the length L2 is 80 inches.

In some embodiments, the second side lap 32 of the jumper module 10 aligns with the second side lap 220 of the photovoltaic module 210a. In some embodiments, the first junction box 38 of the jumper module 10 is electrically connected to the junction box 223 of the photovoltaic module 210a. In some embodiments, the second junction box 40 of the jumper module 10 is electrically connected to the junction box 223 of another of the photovoltaic modules 210b. In some embodiments, the jumper module 10 electrically connects the subarrays S1, S2 of the photovoltaic modules 210 within the array of the photovoltaic system 200. In some embodiments, the first bus ribbon 50 and the second bus ribbon 60 electrically connect the subarrays of the photovoltaic modules 210 with one another. In some embodiments, the first bus ribbon 50 and the second bus ribbon 60 electrically connect the junction boxes 223 of the first subarray S1 of the photovoltaic modules 210 with the junction boxes 223 of the second subarray S2 of the photovoltaic modules 210.

In some embodiments, a plurality of step flaps 226 is installed adjacent to one of the subarrays S1 of the photovoltaic modules 210. In some embodiments, roofing shingles are configured to overlay the step flaps 226. In some embodiments, the roofing shingles are asphalt shingles. In other embodiments, the roofing shingles are electrically inactive solar shingles. In some embodiments, a composition shingle 227 overlays the active portion 12 of the jumper module 10. In other embodiments, another one of the jumper module 10 overlays the jumper module 10 of the first subarray, as shown in FIG. 8. In some embodiments, the composition shingle 227 conceals the jumper modules 10. In some embodiments, the composition shingle 227 is a water-shedding layer.

In some embodiments, the jumper module 10 is coplanar with the plurality of photovoltaic modules 210. As used herein, the term "coplanar" means the jumper module 10 and the plurality of photovoltaic modules 210 are positioned and extend within the same plane, or the jumper module 10 is positioned and extends in a first plane, and the plurality of photovoltaic modules 210 is positioned and extends within a second plane that is offset from the first plane of no more than ten percent of a height measured from the roof deck 202 to an upper surface of the jumper module 10.

In some embodiments, a first flashing base 228 overlays the first side lap 30 of the jumper module 10. In some embodiments, a second flashing base 230 overlays the second side lap 32 of the jumper module 10. In some embodiments, an electrical transition box 232 is installed on the first flashing base 228 and covers the first junction box 38 of the jumper module 10. In some embodiments, the electrical transition box 232 includes a removable cover 234.

Figure 10:
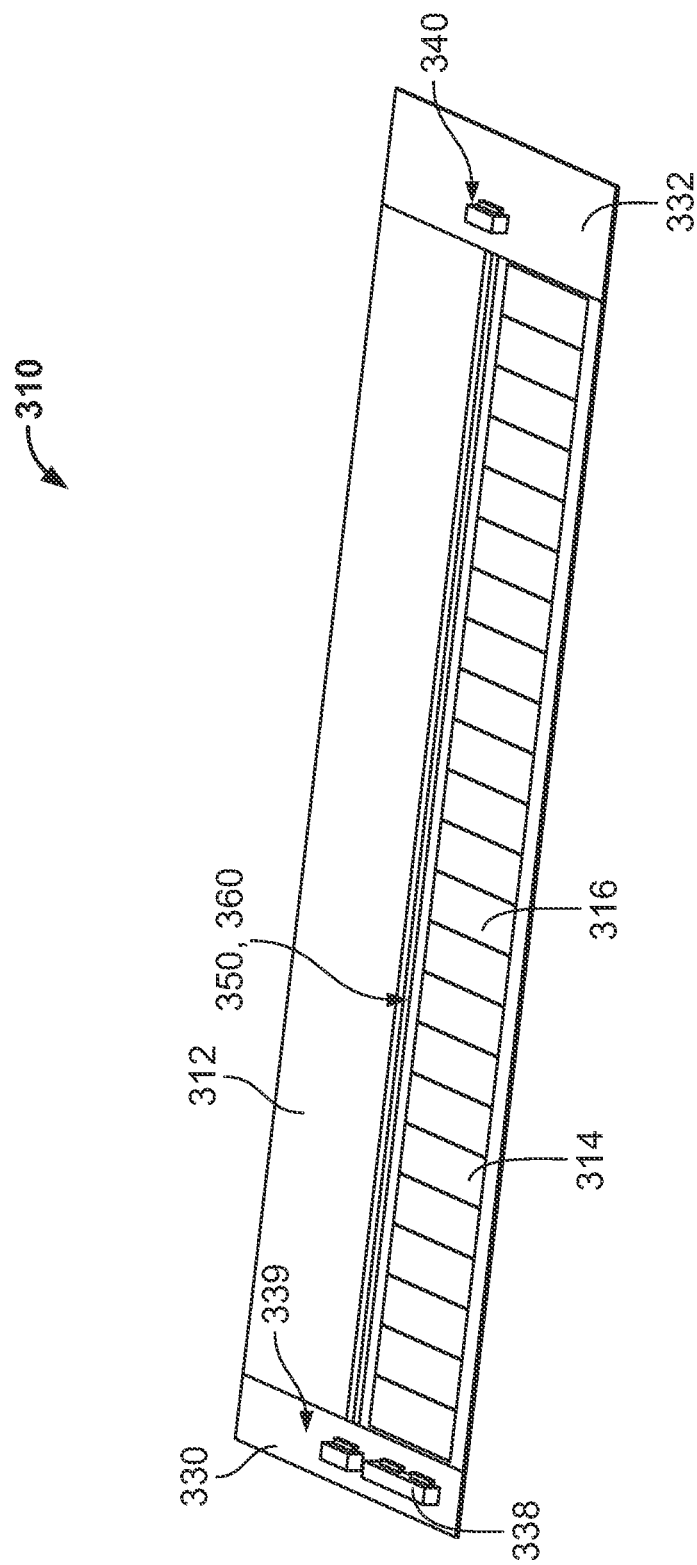
FIG. 10 is a top perspective view of other embodiments of a jumper module for a photovoltaic system.

FIG. 10 shows other embodiments of a jumper module 310. In some embodiments, the jumper module 310 includes a structure and function similar to those of the jumper module 10, but with certain differences as described hereinbelow. In some embodiments, the jumper module 310 includes a head lap portion 312, a reveal portion 314 having a plurality of solar cells 316, a first side lap 330 and a second side lap 332. In some embodiments, a first junction box 338 and a second junction box 339 are located on the first side lap 330. In some embodiments, a third junction box 340 is located on the second side lap 332. In some embodiments, bussing 350, 360 electrically connect the second junction box 339 with the third junction box 340. In some embodiments, the bussing 350, 360 are laminated within the jumper module 310.

In some embodiments, the first side lap 330 of one of the jumper modules 310 overlays the second side lap 332 of another of the jumper modules 310. In other embodiments, the first side lap 330 of one of the jumper modules 310 is positioned proximate to the second side lap 332 of another of the jumper modules 310.

Figure 11:
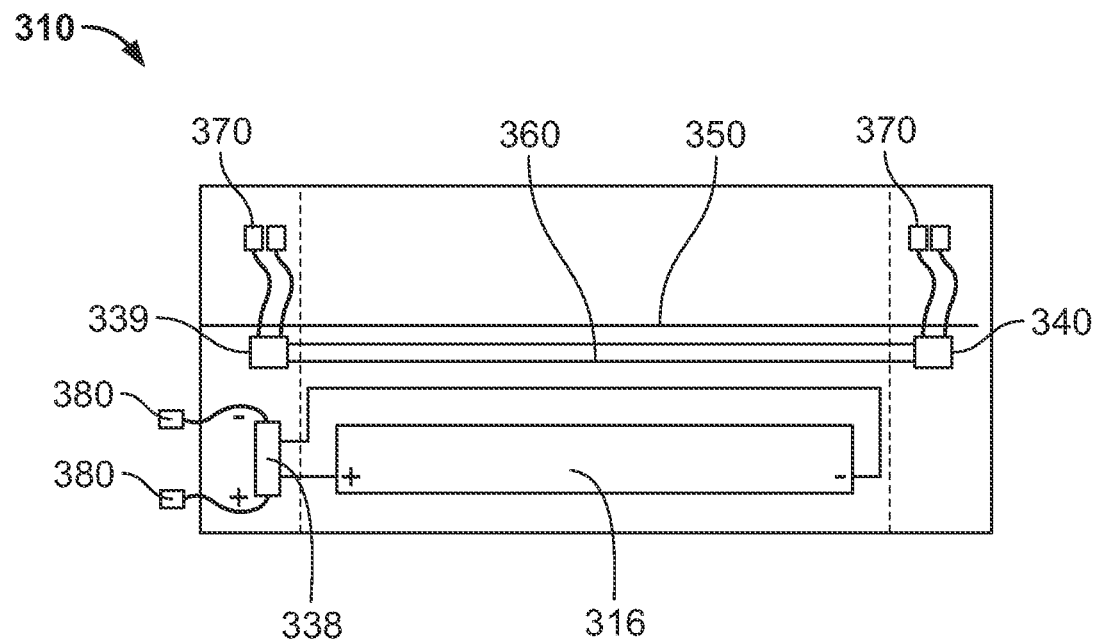
FIG. 11 is a top plan schematic view of other embodiments of the jumper module shown in FIG. 10.

Referring to FIG. 11, in some embodiments, the first junction box 338 is electrically connected to the plurality of solar cells 316. In some embodiments, the first junction box 338 is not electrically connected to the second junction box 339. In some embodiments, the first junction box 338 is not electrically connected to the third junction box 340. In some embodiments, the jumper circuit (the bussing 350, 360, the second junction box 339 and the third junction box 340) is electrically separate from the cell circuit (the first junction box 338 and the plurality of solar cells 316). In some embodiments, one of the jumper module 310 connects with to another one of the jumper module 310. In an embodiment, the jumper circuit of the one of the jumper module 310 is electrically connected to the jumper circuit of the another one of the jumper module 310 by electrical connectors 370. In an embodiment, the cell circuit of the one of the jumper module 310 is electrically connected to the cell circuit of the another one of the jumper module 310 by electrical connectors 380.

Figure 12:
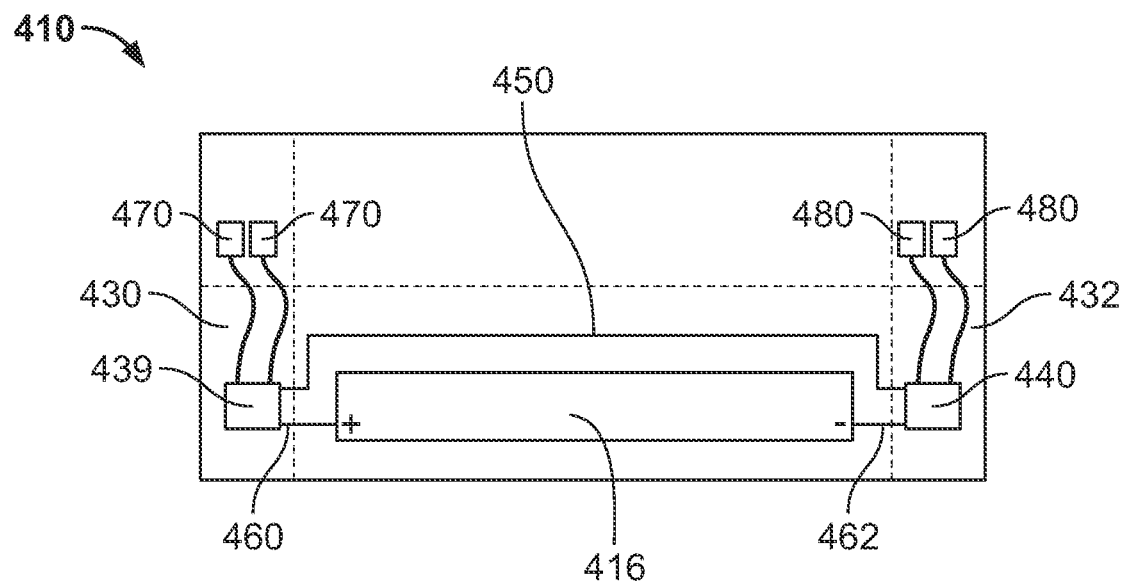
FIG. 12 is a top plan schematic view of other embodiments of a jumper module for a photovoltaic system.

FIG. 12 shows other embodiments of a jumper module 410. In some embodiments, the jumper module 410 includes a structure and function similar to those of the jumper module 310, but with certain differences as described hereinbelow. In some embodiments, the jumper module 410 includes a first junction box 439 located on a first side lap 430 and a second junction box 440 is located on a second side lap 432. In some embodiments, the first junction box 439 and the second junction box 440 are electrically connected to one another by bussing 450. In some embodiments, the first junction box 439 is electrically connected to a plurality of solar cells 416 by bussing 460. In some embodiments, the second junction box 440 is electrically connected to the plurality of solar cells 416 by bussing 462. In some embodiments, one of the jumper module 410 is electrically connected to at least one of another of the jumper module 410 by electrical connectors 470 electrically connected to the first junction box 439 and/or electrical connectors 480 electrically connected to the second junction box 440. In some embodiments, the jumper module 410 is electrically connected to at least one photovoltaic module by the electrical connectors 470 and/or the electrical connectors 480.

Figure 13:
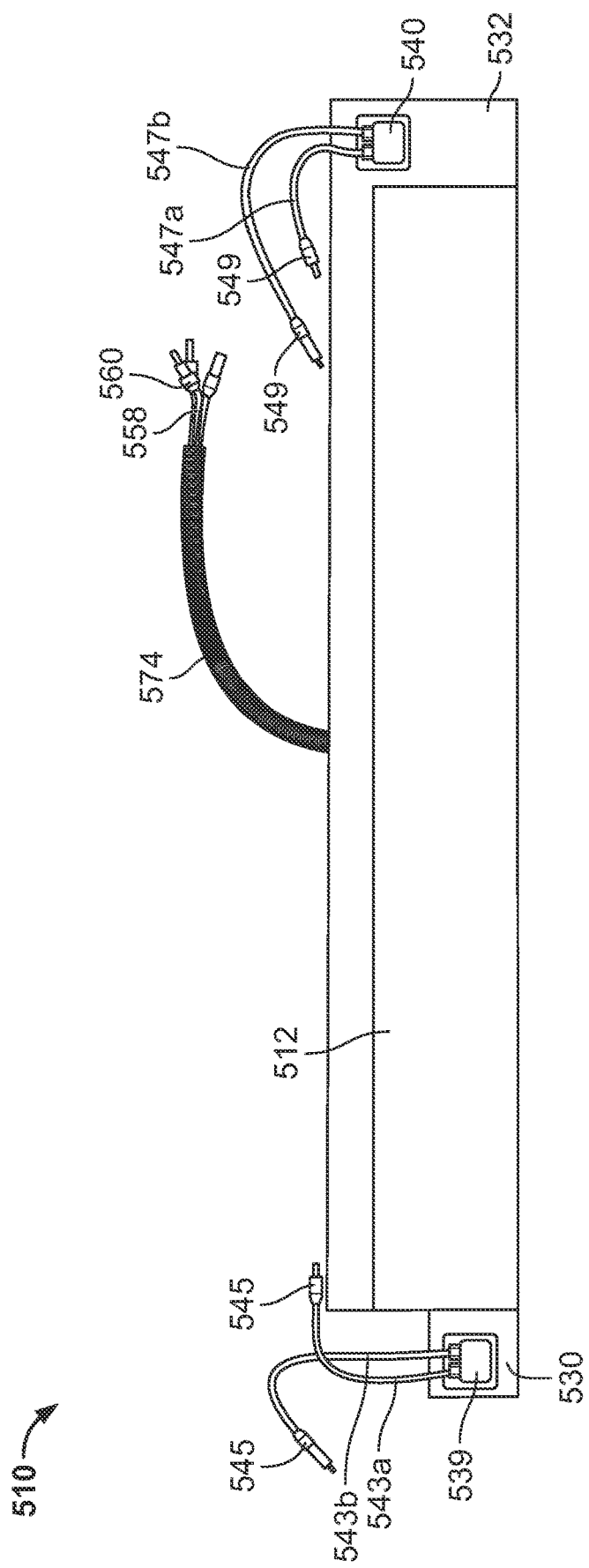
FIGS. 13 and 14 illustrate some embodiments of a jumper module for a photovoltaic system.
Figure 14:
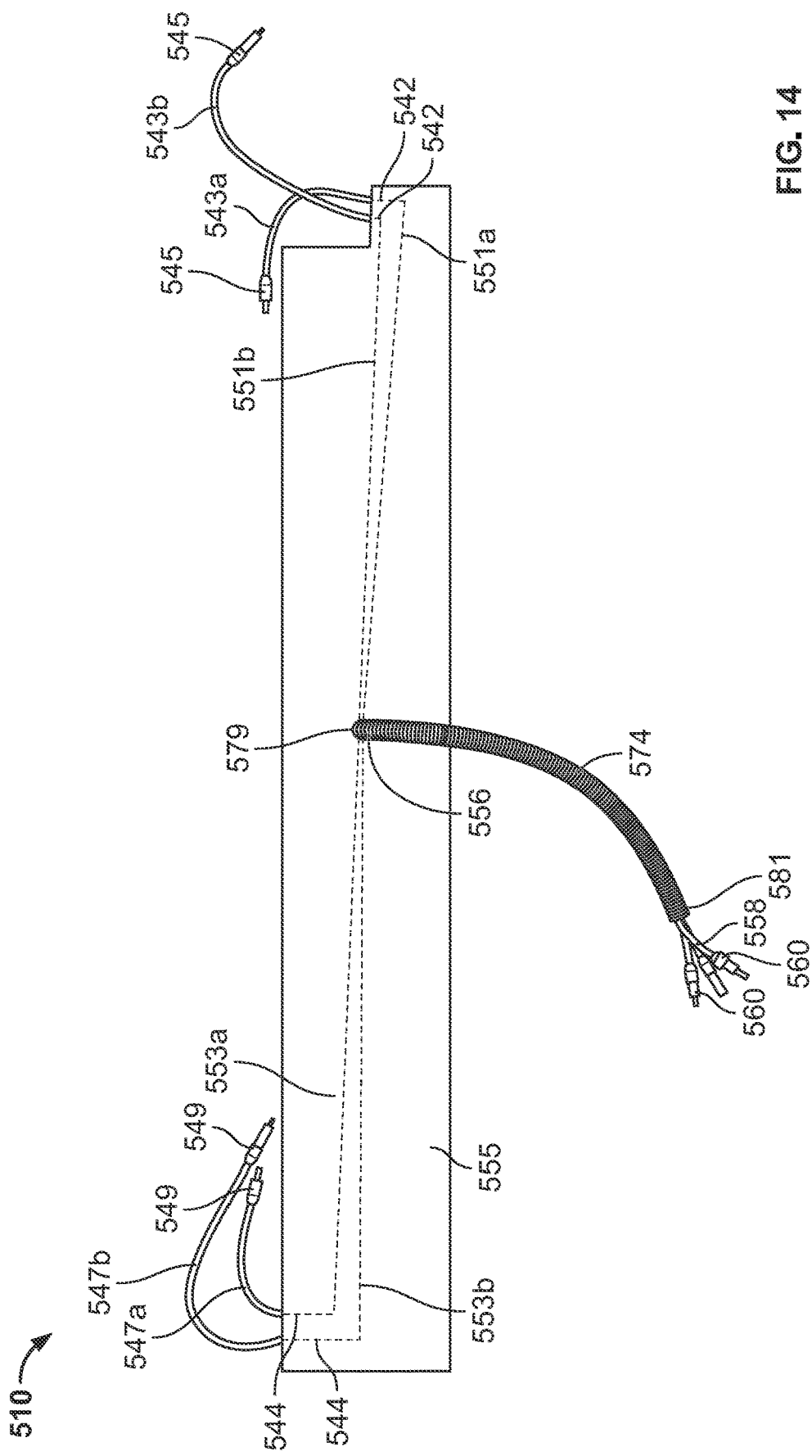

FIGS. 13 and 14 show other embodiments of a jumper module 510. In some embodiments, the jumper module 510 includes a structure and function similar to those of the jumper module 10, but with certain differences as described hereinbelow. In some embodiments, the jumper module 510 includes a first junction box 539 located on a first side lap 530 and a second junction box 540 is located on a second side lap 532. In some embodiments, a pair of first electrical wires 543a, 543b is electrically connected to the first junction box 539. In some embodiments, each of the first electrical wires 543a, 543b includes an electrical connector 545. In some embodiments, the electrical connector 545 of the first electrical wire 543a is a negative electrical connector. In some embodiments, the electrical connector 545 of the first electrical wire 543b is a positive electrical connector. In some embodiments, the electrical connector 545 of the first electrical wire 543a is a positive electrical connector. In some embodiments, the electrical connector 545 of the first electrical wire 543b is a negative electrical connector. In some embodiments, a pair of second electrical wires 547a, 547b is electrically connected to the second junction box 540. In some embodiments, each of the second electrical wires 547a, 547b includes an electrical connector 549. In some embodiments, the electrical connector 549 of the second electrical wire 547a is a positive electrical connector. In some embodiments, the electrical connector 549 of the second electrical wire 547b is a negative electrical connector. In some embodiments, the electrical connector 549 of the second electrical wire 547a is a negative electrical connector. In some embodiments, the electrical connector 549 of the second electrical wire 547b is a positive electrical connector.

In some embodiments, an active portion 512 of the jumper module 510 includes a pair of first inner electrical wires 551a, 551b. In some embodiments, first ends 542 of the pair of first inner electrical wires 551a, 551b is electrically connected to the first junction box 539. In some embodiments, the active portion 512 of the jumper module 510 includes a pair of second inner electrical wires 553a, 553b. In some embodiments, first ends 544 of the pair of second inner electrical wires 553a, 553b is electrically connected to the second junction box 540. In some embodiments, an encapsulant encapsulates at least a portion of the first inner electrical wires 551a, 551b and at least a portion of the second inner electrical wires 553a, 553b, similar to that as described above with respect to the encapsulant 44 encapsulating the bussing 42.

In some embodiments, an aperture 556 is formed within a lower side 555 of the jumper module 510. In some embodiments, at least a portion of the first inner electrical wires 551a, 551b extends from the aperture 556 from the lower side 555. In some embodiments, at least a portion of the second inner electrical wires 553a, 553b extends from the aperture 556 from the lower side 555. In some embodiments, a second end 558 of each of the first inner electrical wires 551a, 551b includes an electrical connector 560. In some embodiments, the second end 558 of each of the second inner electrical wires 553a, 553b includes an electrical connector 560.

In some embodiments, the electrical connector 560 of the first inner electrical wire 551a is a positive electrical connector. In some embodiments, the electrical connector 560 of the first inner electrical wire 551b is a negative electrical connector. In some embodiments, the electrical connector 560 of the first inner electrical wire 551a is a negative electrical connector. In some embodiments, the electrical connector 560 of the first inner electrical wire 551b is a positive electrical connector. In some embodiments, the electrical connector 560 of the second inner electrical wire 553a is a negative electrical connector. In some embodiments, the electrical connector 560 of the second inner electrical wire 553b is a positive electrical connector. In some embodiments, the electrical connector 560 of the second inner electrical wire 553a is a positive electrical connector. In some embodiments, the electrical connector 560 of the second inner electrical wire 553b is a negative electrical connector.

In some embodiments, a conduit 574 includes a first end 579 and a second end 581 opposite the first end 579. In some embodiments, the conduit 574 is tubular. In some embodiments, the first end 579 of the conduit is attached to the lower side 555 of the jumper module 510. In some embodiments, the conduit 574 is a flexible conduit. In some embodiments, at least a portion of the first inner electrical wires 551a, 551b and at least a portion of the second inner electrical wires 553a, 553b extend through the conduit 574.

In some embodiments, the second ends 558 of the first inner electrical wires 551a, 551b extend from the second end 581 of the conduit 574. In some embodiments, the second ends 558 of the second inner electrical wires 553a, 553b extend from the second end 581 of the conduit 574. In some embodiments, the conduit 574 is configured to be installed and inserted within an aperture formed within a roof deck of a structure. In some embodiments, at least a portion of the first inner electrical wires 551a, 551b and at least a portion of the second inner electrical wires 553a, 553b extend through the aperture of the roof deck. In some embodiments, the electrical connectors 560 are configured to electrically connect to electrical connectors of electrical components house within an interior portion of the structure.

In some embodiments, the jumper module 510 connects at least two strings or columns of the photovoltaic modules 210 in parallel. In some embodiments, the jumper module 510 connects at least two strings or columns of the photovoltaic modules 210 in series. In some embodiments, the jumper module 510 is a watershedding layer.

It should be understood that the embodiments described herein are merely exemplary and that a person skilled in the art may make many variations and modifications without departing from the spirit and scope of the invention. All such variations and modifications are intended to be included within the scope of the invention.

What is claimed is:

1. A system, comprising:
   a plurality of photovoltaic modules installed on a roof deck,
      wherein the photovoltaic modules are arranged in an array on the roof deck; and
   at least one jumper module electrically connecting a first subarray of the array and a second subarray of the array,
   wherein the at least one jumper module includes,
      a plurality of electrical wires,
         wherein each of the electrical wires includes
         a first end, and
         a second end opposite the first end of the electrical wire,
      an encapsulant encapsulating at least a portion of the electrical wires,
         wherein the encapsulant includes a first surface and a second surface opposite the first surface,
         wherein the plurality of electrical wires electrically connects the first subarray to the second subarray,
      a frontsheet juxtaposed with the first surface of the encapsulant, and
      a backsheet juxtaposed with the second surface of the encapsulant,
         wherein the backsheet includes
         a polymer layer,
            wherein the polymer layer forms a lower surface of the at least one jumper module,
            wherein the second end of each of the electrical wires extends outwardly from the lower surface of the at least one jumper module, and
         a conduit having a first end and a second end opposite the first end of the conduit,
            wherein the first end of the conduit is attached to the lower surface of the at least one jumper module, and
            wherein the second end of each of the plurality of electrical wires is configured to extend from the second end of the conduit.

2. The system of claim 1, wherein the at least one jumper module includes a first side lap located at a first end thereof and a second side lap located at a second end thereof opposite the first end.

3. The system of claim 2, wherein the at least one jumper module includes a first junction box located on the first side lap, and wherein the first junction box is electrically connected to the plurality of electrical wires.

4. The system of claim 3, wherein the at least one jumper module includes a second junction box located on the second side lap, and wherein the second junction box is electrically connected to the plurality of electrical wires.

5. The system of claim 1, wherein the conduit is a flexible tubular conduit.

6. The system of claim 1, wherein the first subarray includes a first plurality of the photovoltaic modules arranged in a first column comprising a first plurality of rows, wherein the second subarray includes a second plurality of the photovoltaic modules arranged in a second column comprising a second plurality of rows, and wherein the first subarray is horizontally adjacent to the second subarray.

7. The system of claim 6, wherein a first one of the at least one jumper module is vertically adjacent to an upper end of the first subarray.

8. The system of claim 1, wherein the at least one jumper module includes a plurality of solar cells.

9. The system of claim 1, wherein the at least one jumper module is installed on the roof deck by a plurality of fasteners.

10. The system of claim 2, wherein the plurality of electrical wires extends from a location proximate to the first end of the at least one jumper module to a location proximate to the second end of the at least one jumper module.

11. The system of claim 4, wherein at least one of the plurality of photovoltaic modules of the first subarray includes a third junction box, wherein the third junction box is electrically connected to the first junction box.

12. The system of claim 11, wherein at least one of the plurality of photovoltaic modules of the second subarray includes a fourth junction box, wherein the fourth junction box is electrically connected to the second junction box.

13. The system of claim 11, wherein the at least one of the plurality of photovoltaic modules of the first subarray includes a head lap portion, and wherein one of the at least one jumper module overlays the head lap portion.

14. The system of claim 13, wherein the at least one of the plurality of photovoltaic modules of the first subarray includes a first side lap, and wherein the first side lap of the one of the at least one jumper module is proximate to the first side lap of the at least one of the plurality of photovoltaic modules of the first subarray.

15. The system of claim 14, wherein the at least one of the plurality of photovoltaic modules of the first subarray includes a second side lap, and wherein the second side lap of the one of the at least one jumper module is proximate to the second side lap of the at least one of the plurality of photovoltaic modules of the first subarray.

16. The system of claim 4, wherein the at least one jumper module includes a plurality of jumper modules, and wherein the first side lap of another one of the plurality of jumper modules overlaps the second side lap of the one of the plurality of jumper modules.

17. The system of claim 16, wherein the first junction box of the another one of the plurality of jumper modules is proximate to and electrically connected to the second junction box of the one of the plurality of jumper modules.

18. The system of claim 17, wherein at least one of the second plurality of photovoltaic modules of the second subarray includes a head lap portion, and wherein the another one of the plurality of jumper modules overlaps the head lap portion of the at least one of the plurality of photovoltaic modules of the second subarray.

19. The system of claim 18, wherein the polymer layer of the backsheet is composed of thermoplastic polyolefin (TPO).

20. The system of claim 18, wherein the backsheet includes a second layer attached to the polymer layer of the backsheet.

* * * * *